(12) United States Patent
Kusashima

(10) Patent No.: US 12,041,603 B2
(45) Date of Patent: Jul. 16, 2024

(54) COMMUNICATION DEVICE AND COMMUNICATION METHOD

(71) Applicant: SONY GROUP CORPORATION, Tokyo (JP)

(72) Inventor: Naoki Kusashima, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 468 days.

(21) Appl. No.: 17/309,903

(22) PCT Filed: Dec. 18, 2019

(86) PCT No.: PCT/JP2019/049606
§ 371 (c)(1),
(2) Date: Jun. 28, 2021

(87) PCT Pub. No.: WO2020/145056
PCT Pub. Date: Jul. 16, 2020

(65) Prior Publication Data
US 2022/0095329 A1    Mar. 24, 2022

(30) Foreign Application Priority Data
Jan. 10, 2019   (JP) ................................ 2019-002386

(51) Int. Cl.
*H04W 72/1268* (2023.01)
*H04L 1/1812* (2023.01)
*H04W 72/52* (2023.01)
*H04W 74/0808* (2024.01)

(52) U.S. Cl.
CPC ....... *H04W 72/1268* (2013.01); *H04W 72/52* (2023.01); *H04W 74/0808* (2013.01); *H04L 1/1812* (2013.01)

(58) Field of Classification Search
CPC ............. H04W 72/1268; H04W 72/52; H04W 74/0808; H04W 72/21; H04W 16/14; H04W 28/04; H04W 72/1273; H04W 72/23; H04W 72/542; H04L 1/1812; H04L 1/1822; H04L 1/1854
See application file for complete search history.

(56) References Cited

U.S. PATENT DOCUMENTS

| 2017/0142705 | A1  | 5/2017 | Chendamarai et al. |
| 2021/0160919 | A1* | 5/2021 | Wang ..................... H04W 74/08 |
| 2021/0211908 | A1* | 7/2021 | Jiang ..................... H04L 5/0051 |

OTHER PUBLICATIONS

Office Action for IN Patent Application No. 202117025845, dated Jan. 13, 2023, 07 pages of Office Action.

(Continued)

*Primary Examiner* — Kyaw Z Soe
(74) *Attorney, Agent, or Firm* — CHIP LAW GROUP

(57) ABSTRACT

Provided is a communication device that includes a communication unit that performs radio communication, and a control unit that performs carrier sensing together with a base station and that performs control so that a radio signal is transmitted via a carrier which is designated by the base station based on results of the carrier sensing. The control unit further performs control so that information relating to transmission of uplink control information in a case where the transmission of the uplink control information via the carrier is suppressed is acquired from the base station.

22 Claims, 11 Drawing Sheets

(56) References Cited

OTHER PUBLICATIONS

"Enhancements on HARQ for NR-U operation", MediaTek Inc, R1-1812358, 3rd Generation Partnership Project, 3GPP TSG RAN WG1, 95th Meeting , Spokane, USA, Nov. 12-16, 2018, 7 pages.
"HARQ-ACK enhancement for NR-U", Lenovo, Motorola Mobility, R1-1812781, 3rd Generation Partnership Project, 3GPP TSG RAN WG1, 95th Meeting, Spokane, USA, Nov. 12-16, 2018, 4 pages.
"Enhancements on HARQ for NR-U operation", MediaTek Inc., 3GPP TSG RAN WG1, 95th Meeting, R1-1812358 Spokane, USA, Nov. 12-16, 2018, 07 pages.
"HARQ-ACK enhancement for NR-U", Lenovo, Motorola Mobility, 3GPP TSG RAN WG1, 95th Meeting, R1-1812781 Spokane, USA, Nov. 12-16, 2018, 05 pages.
"Enhancements on HARQ for NR-U operation", MediaTek Inc., 3GPP TSG RAN WG1 #94b R1-1810444, Sep. 29, 2018.
"Study on NR-based Access to Unlicensed Spectrum", RP-172021, 3GPP TSG RAN Meeting #77, Sapporo, Japan, Sep. 11-14, 2017.
"MulteFire Release 1.0 Technical Paper", MulteFire Alliance., search on Dec. 13, 2018, 25 pages.
International Search Report and Written Opinion of PCT Application No. PCT/JP2019/049606, dated Feb. 10, 2020, 10 pages of ISRWO.

\* cited by examiner

COMMUNICATION DEVICE AND COMMUNICATION METHOD

CROSS REFERENCE TO RELATED APPLICATIONS

This application is a U.S. National Phase of International Patent Application No. PCT/JP2019/049606 filed on Dec. 18, 2019, which claims priority benefit of Japanese Patent Application No. JP 2019-002386 filed in the Japan Patent Office on Jan. 10, 2019. Each of the above-referenced applications is hereby incorporated herein by reference in its entirety.

FIELD

The present disclosure relates to a communication device, a communication method, and a program.

BACKGROUND

Radio access systems and radio networks for cellular mobile communication (hereinafter also referred to as "Long Term Evolution (LTE)", "LTE-Advanced (LTE-A)", "LTE-Advanced Pro (LTE-A Pro)", "New Radio (NR)", "New Radio Access Technology (NRAT)", "Evolved Universal Terrestrial Radio Access (EUTRA)", or "Further EUTRA (FEUTRA)") have been studied for the 3rd Generation Partnership Project (3GPP). Note that, in the following description, LTE includes LTE-A, LTE-A Pro, and EUTRA, and NR includes NRAT and FEUTRA. In the case of LTE, base station devices (base stations) are also referred to as evolved NodeB (eNodeB); in the case of NR, base station devices (base stations) are also referred to as gNodeB; and, in the case of LTE and NR, terminal devices (mobile stations, mobile station devices, and terminals) are also referred to as user equipment (UE). LTE and NR are cellular communication systems in which a plurality of areas for which base station devices provide coverage are arranged in the form of cells. A single base station device may also manage a plurality of cells.

NR is Radio Access Technology (RAT), which differs from LTE and represents the next-generation radio access system relative to LTE. NR is access technology enabling compatibility with various use cases that include Enhanced mobile broadband (eMBB), Massive machine type communications (mMTC), and Ultra reliable and low latency communications (URLLC). NR is being examined with the goal of a technology framework for handling usage scenarios, requirements, and layout scenarios for such use cases.

The application of cellular communication-based radio access systems is being examined for unlicensed bands and license shared bands. In such unlicensed bands, coexistence with other nodes and radio systems is considered important, and for LTE, NR, and other such radio access systems, functions such as Listen Before Talk (LBT), in which channel sensing is performed before transmission, and discontinuous transmission are required. Details of NR-based radio access systems in unlicensed bands are disclosed in Non Patent Literature 1. Note that unlicensed bands are, for example, the 2.4-GHz band, the 5-GHz band, and the 6-GHz band. Licensed shared bands are, for example, the 3.5-GHz band and the 37-GHz band. Non Patent Literature 2 also discloses an example of a technology pertaining to the application of radio access systems in unlicensed bands.

CITATION LIST

Non Patent Literature

Non Patent Literature 1: RP-172021, "Study on NR-based Access to Unlicensed Spectrum," 3GPP TSG RAN Meeting #77, Sapporo, Japan, Sep. 11-14, 2017.
Non Patent Literature 2: "MulteFire Release 1.0 Technical Paper", [online], MulteFire Alliance, [search on Dec. 13, 2018], internet <https://www.multefire.org/wp-content/uploads/MulteFire-Release-1.0-whitepaper_FINAL.pdf>

SUMMARY

Technical Problem

The implementation of NR-based radio communication utilizing unlicensed bands is also under consideration for the Fifth-Generation mobile communication system (5G). Such NR-based radio communication utilizing unlicensed bands are also referred to as "NR-Unlicensed (NR-U)". In order to support various use cases assumed for NR-U, consideration has, for example, been given to mechanisms that involve using unlicensed bands to perform transmission of synchronization signals (SS), and of physical channels and physical signals transmitted in a primary cell (PCell, PSCell) such as PRACH or PUCCH.

However, when an unlicensed band is utilized, a communication device determines whether or not the channel is available by performing channel sensing (LBT) before information transmission, and performs information transmission when the channel is available. In other words, in situations where an unlicensed band is utilized, it may be difficult, depending on the LBT result, for the communication device to perform information transmission (and, as a result, information transmission may be suppressed). Hence, in the case of NR-U, a situation can be expected where uplink control information (for example, uplink control information (UCI)) is not transmitted from a terminal device to the base station according to channel availability. In such a situation, it is also to be expected that radio communication resources are consumed unnecessarily due to data retransmission and the like, for example, and that the utilization of the overall system resources is reduced.

Thus, the present disclosure proposes technology that enables radio communication utilizing unlicensed bands to be realized in a more preferable manner.

Solution to Problem

According to the present disclosure, a communication device is provided that includes: a communication unit that performs radio communication; and a control unit that performs carrier sensing together with a base station and that performs control so that a radio signal is transmitted via a carrier which is designated by the base station according to the results of the sensing, wherein the control unit performs control so that information relating to transmission of uplink control information in a case where transmission of the uplink control information via the carrier is suppressed is acquired from the base station.

Moreover, according to the present disclosure, a communication device is provided that includes: a communication unit that performs radio communication; and a control unit that performs control so that a radio signal is transmitted via a carrier which is designated for a terminal device according to results of carrier sensing together with the terminal device, wherein the control unit performs control so that information relating to transmission of uplink control information, in a case where transmission of the uplink control information via the carrier by the terminal device is suppressed, is transmitted to the terminal device.

Moreover, according to the present disclosure, a communication method performed by a computer is provided, the method including: performing radio communication; and performing carrier sensing together with a base station and performing control so that a radio signal is transmitted via a carrier which is designated by the base station according to the results of the sensing, wherein control is performed so that information relating to transmission of uplink control information in a case where transmission of the uplink control information via the carrier is suppressed is acquired from the base station.

Moreover, according to the present disclosure, a communication method performed by a computer is provided, the method including: performing radio communication; and performing control so that a radio signal is transmitted via a carrier which is designated for a terminal device according to results of carrier sensing together with the terminal device, wherein control is performed so that information relating to transmission of uplink control information, in a case where transmission of the uplink control information via the carrier by the terminal device is suppressed, is transmitted to the terminal device.

Moreover, according to the present disclosure, a program is provided that causes a computer to execute: performing radio communication; and performing carrier sensing together with a base station and performing control so that a radio signal is transmitted via a carrier which is designated by the base station according to the results of the sensing, wherein control is performed so that information relating to transmission of uplink control information in a case where transmission of the uplink control information via the carrier is suppressed is acquired from the base station.

Moreover, according to the present disclosure, a program is provided that causes a computer to execute: performing radio communication; and performing control so that a radio signal is transmitted via a carrier which is designated for a terminal device according to results of carrier sensing together with the terminal device, wherein control is performed so that information relating to transmission of uplink control information, in a case where transmission of the uplink control information via the carrier by the terminal device is suppressed, is transmitted to the terminal device.

DESCRIPTION OF EMBODIMENTS

A preferred embodiment of the present disclosure will be described in detail hereinbelow with reference to the accompanying drawings. Note that, in the present specification and drawings, redundant descriptions of components having substantially the same function configuration are omitted by assigning the same reference signs.

Note that descriptions will be provided in the following order.

1. Configuration example
1.1 System configuration example
1.2. Base station configuration example
1.3. Terminal device configuration example
2. Studies relating to NR-U implementation
3. Technical features
4. Application examples
4.1. Base station-related application examples
4.2. Terminal device-related application examples
5. Conclusion

1. CONFIGURATION EXAMPLE

<1.1 System Configuration Example>

Figure 1:
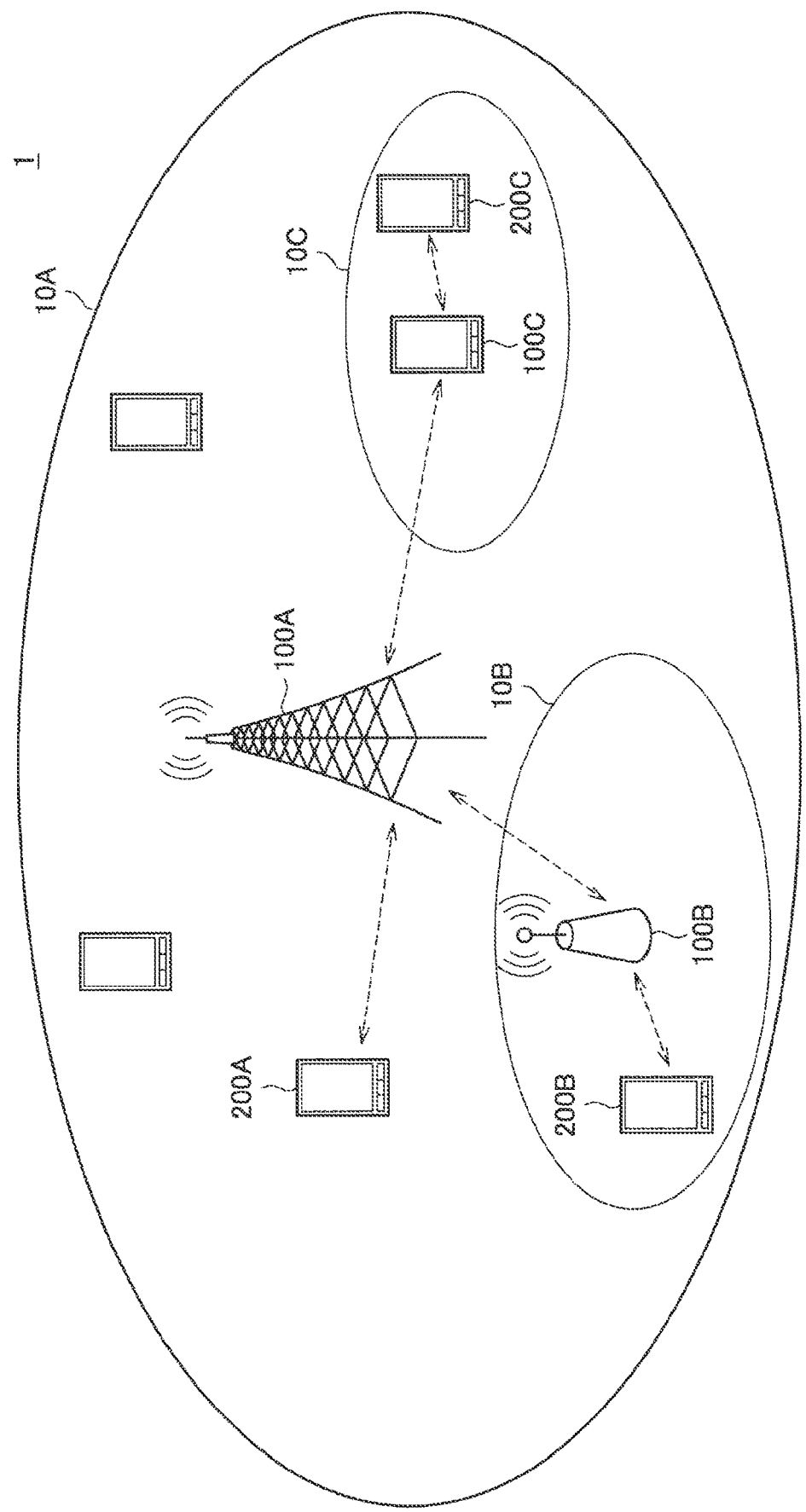
FIG. 1 is an explanatory diagram to illustrate an example of a schematic configuration of a system according to an embodiment of the present disclosure.

First, an example of a schematic configuration of a system 1 according to an embodiment of the present disclosure will be described with reference to FIG. 1. FIG. 1 is an explanatory diagram to illustrate an example of a schematic configuration of the system 1 according to the embodiment of the present disclosure. As illustrated in FIG. 1, the system 1 includes a radio communication device 100 and a terminal device 200. Here, the terminal device 200 is also called a user. The user may also be called a UE. A radio communication device 100C is also called a UE-Relay. Here, a UE may be a UE as defined under LTE or LTE-A, and a UE-Relay may be a Prose UE to Network Relay pursuant to 3GPP but, more generally, may mean communication equipment.

(1) Radio Communication Device 100

The radio communication device 100 is a device that provides radio communication services to subordinate devices. For example, a radio communication device 100A is a base station of a cellular system (or a mobile communication system). A base station 100A performs radio communication with a device (for example, a terminal device 200A) located inside a cell 10A of the base station 100A. For example, the base station 100A transmits a downlink signal to the terminal device 200A and receives an uplink signal from the terminal device 200A.

The base station 100A is logically connected using an X2 interface, for example, to another base station, and is capable of transmitting and receiving control information and the like. Furthermore, the base station 100A is logically connected using an S1 interface, for example, to a so-called core network (illustration is omitted), and is capable of transmitting and receiving control information and the like. Note that communications between these devices may be physically relayed by various devices.

Here, the radio communication device 100A illustrated in FIG. 1 is a macrocell base station, and the cell 10A is a macrocell. Meanwhile, radio communication devices 100B and 100C are master devices operating small cells 10B and 10C, respectively. By way of an example, a master device 100B is a small-cell base station that is installed so as to be fixed. A small-cell base station 100B establishes a radio backhaul link with the macrocell base station 100A and an access link with one or more terminal devices (terminal device 200B, for example) in the small cell 10B. Note that the radio communication device 100B may be a relay node defined under 3GPP. The master device 100C is a dynamic AP (access point). The dynamic AP 100C is a mobile device that dynamically operates the small cell 10C. The dynamic AP 100C establishes a radio backhaul link with the macrocell base station 100A and an access link with one or more terminal devices (terminal device 200C, for example) in the small cell 10C. The dynamic AP 100C may be a terminal device in which hardware or software is installed which is capable of operating as a base station or a radio access point, for example. The small cell 10C in this case is a local network (a localized network/virtual cell) which is dynamically formed.

The cell 10A may be operated according to any radio communication system such as LTE, LTE-Advanced (LTE-A), LTE-ADVANCED PRO, GSM (registered trademark), UMTS, W-CDMA, CDMA2000, WiMAX, WiMAX2, or IEEE 802.16, for example.

Note that a small cell is a concept that may include various cell types smaller than a macrocell (for example, femtocells, nanocells, picocells and microcells, and so forth) arranged so as to overlap or not overlap a macrocell. In a certain example, a small cell is operated by a dedicated base station. In another example, a small cell is operated due to a terminal constituting a master device temporarily operating as a small-cell base station. A so-called relay node can also be regarded as a form of small-cell base station. A radio communication device that functions as a parent station of a relay node is also called a donor base station. A donor base station may refer to a DeNB in LTE, or more generally refer to the parent station of a relay node.

(2) Terminal Device 200

A terminal device 200 is capable of communicating in a cellular system (or a mobile communication system). The terminal device 200 performs radio communication with radio communication devices in the cellular system (for example, the base station 100A and the master device 100B or 100C). For example, the terminal device 200A receives a downlink signal from the base station 100A and transmits an uplink signal to the base station 100A.

Furthermore, the terminal device 200 is not limited to only a so-called UE, rather, so-called low-cost terminals (low cost UE) such as MTC terminals, Enhanced MTC (eMTC) terminals, and NB-IoT terminals, for example, may also be adopted. Additionally, infrastructure terminals such as Road Side Units (RSUs) and terminals such as Customer Premises Equipment (CPE) may also be adopted.

(3) Supplementary Information

Although a schematic configuration of the system 1 is illustrated hereinabove, this technology is not limited to the example illustrated in FIG. 1. For example, as the configuration of the system 1, a configuration which does not include a master device, a Small Cell Enhancement (SCE), a Heterogeneous Network (HetNet), an MTC network, or the like, may be adopted. Furthermore, as another example of the configuration of the system 1, a master device may be connected to a small cell, and a cell subordinate to the small cell may be constructed.

<1.2. Base Station Configuration Example>

Figure 2:
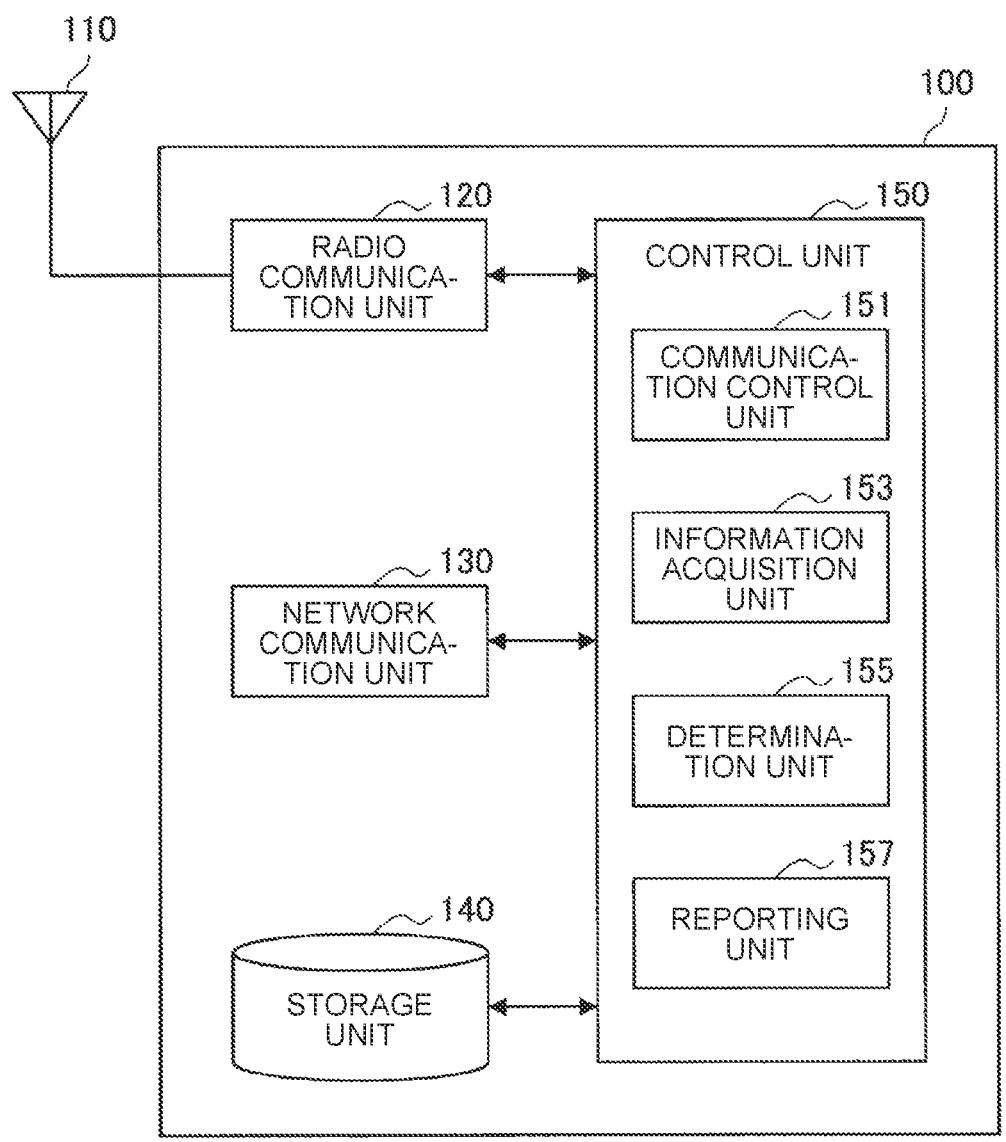
FIG. 2 is a block diagram illustrating an example of the configuration of a base station according to the embodiment.

Next, the configuration of a base station 100 according to the embodiment of the present disclosure will be described with reference to FIG. 2. FIG. 2 is a block diagram illustrating an example of the configuration of the base station 100 according to the embodiment of the present disclosure. Referring to FIG. 2, the base station 100 includes an antenna unit 110, a radio communication unit 120, a network communication unit 130, a storage unit 140, and a control unit 150.

(1) Antenna Unit 110

The antenna unit 110 radiates a signal which is outputted by the radio communication unit 120 into space as a radio wave. In addition, the antenna unit 110 converts the radio wave in space into a signal and outputs the signal to the radio communication unit 120.

(2) Radio Communication Unit 120

The radio communication unit 120 transmits and receives signals. For example, the radio communication unit 120 transmits a downlink signal to a terminal device and receives an uplink signal from the terminal device.

(3) Network Communication Unit 130

The network communication unit 130 transmits and receives information. For example, the network communication unit 130 transmits information to other nodes and receives information from the other nodes. For example, the other nodes include other base stations and core network nodes.

Note that, as mentioned earlier, in the case of the system 1 according to this embodiment, the terminal device sometimes operates as a relay terminal, relaying communications between a remote terminal and the base station. In such a case, the radio communication device 100C, which is equivalent to the relay terminal, does not need to be equipped with the network communication unit 130, for example.

(4) Storage Unit 140

The storage unit 140 temporarily or permanently stores various data and a program for operating the base station 100.

(5) Control Unit 150

The control unit 150 provides various functions of the base station 100. The control unit 150 includes a communication control unit 151, an information acquisition unit 153, a determination unit 155, and a reporting unit 157. Note that the control unit 150 may further include constituent elements other than these constituent elements. That is, the control unit 150 may also perform operations other than the operations of these constituent elements.

The communication control unit 151 executes various processing pertaining to control of radio communication with the terminal device 200 via the radio communication unit 120. For example, the communication control unit 151 may control transmission of various information and data to the terminal device 200 according to a determination result by the determination unit 155 (described subsequently) regarding whether or not a desired channel is available. More specifically, the communication control unit 151 may suppress transmission of various information and data to the terminal device 200 when usage of the target channel is difficult. In addition, the communication control unit 151 may control the assignment of resources that enables the terminal device 200 to transmit the various information and data to the base station 100. Furthermore, the communication control unit 151 executes various processing relating to controlling communications with other nodes (for example, other base stations, core network nodes, and the like) via the network communication unit 130.

The information acquisition unit 153 acquires various information from the terminal device 200 and other nodes. The acquired information may be used for control such as control of radio communication with a terminal device or control pertaining to connections with other nodes, for example.

The determination unit 155 performs various determinations pertaining to control of radio communication with the terminal device 200 via the radio communication unit 120. For example, the determination unit 155 may determine, by performing channel sensing (LBT, for example), whether or not the channel can be used to transmit various information and data.

The reporting unit 157 reports various information to the terminal device 200 and other nodes. As a specific example, the reporting unit 157 may report, to the terminal device 200, various information that enables the terminal device 200 in the cell to perform radio communication with the base station 100. As a specific example, the reporting unit 157 may report, to the terminal device 200, information relating to the separate transmission and retransmission of various information and data (for example, resource information or the like) whereby transmission to the base station 100 is suppressed according to various conditions such as the results of channel sensing by the terminal device 200. Furthermore, as another example, the reporting unit 157 may also report information acquired from the terminal device 200 in the cell to another node (another base station, for example). In addition, the reporting unit 157 may report, to the terminal device 200 in the cell, information that enables the terminal device 200 to perform inter-terminal communication (sidelink communication, for example) with another terminal device 200.

<1.3. Terminal Device Configuration Example>

Figure 3:
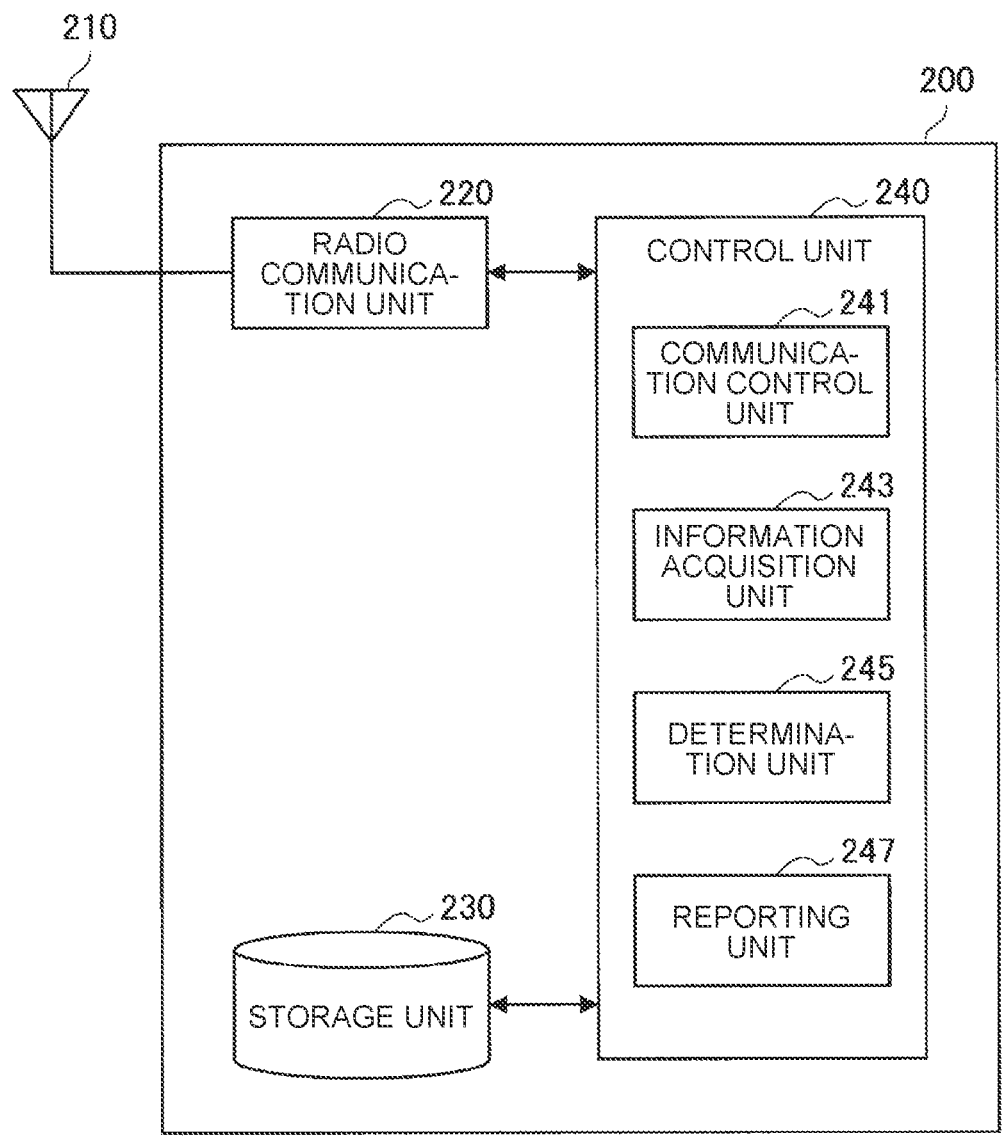
FIG. 3 is a block diagram illustrating an example of the configuration of a terminal device according to the embodiment.

Next, an example of the configuration of the terminal device 200 according to the embodiment of the present disclosure will be described with reference to FIG. 3. FIG. 3 is a block diagram illustrating an example of the configuration of the terminal device 200 according to the embodiment of the present disclosure. As illustrated in FIG. 3, the terminal device 200 includes an antenna unit 210, a radio communication unit 220, a storage unit 230, and a control unit 240.

(1) Antenna Unit 210

The antenna unit 210 radiates a signal, which is outputted by the radio communication unit 220, into space as a radio wave. In addition, the antenna unit 210 converts a radio wave in space into a signal and outputs the signal to the radio communication unit 220.

(2) Radio Communication Unit 220

The radio communication unit 220 transmits and receives signals. For example, the radio communication unit 220 receives a downlink signal from a base station and transmits an uplink signal to the base station.

In addition, in the case of the system 1 according to this embodiment, the terminal device 200 sometimes performs direct communication with another terminal device 200 without going via the base station 100. In this case, the radio communication unit 220 may transmit and receive sidelink signals to/from the other terminal device 200.

(3) Storage Unit 230

The storage unit 230 temporarily or permanently stores a program for operating the terminal device 200 and various data.

(4) Control Unit 240

The control unit 240 provides various functions of the terminal device 200. For example, the control unit 240 includes a communication control unit 241, an information acquisition unit 243, a determination unit 245, and a reporting unit 247. Note that the control unit 240 may further include other constituent elements in addition to these constituent elements. That is, the control unit 240 may also perform operations other than the operations of these constituent elements.

The communication control unit 241 executes various processing pertaining to control of radio communication, via the radio communication unit 220, with the base station 100 and other terminal devices 200. For example, the communication control unit 241 may control transmission of various information and data to the base station 100 according to a determination result by the determination unit 245 (described subsequently) regarding whether or not the desired channel is available. More specifically, the communication control unit 241 may suppress transmission of various information and data to the base station 100 when usage of the target channel is difficult. In addition, the communication control unit 241 may suppress the scheduled transmission of various information and data to the base station 100 according to an instruction from the base station 100. In this case, the communication control unit 241 may perform control so that various information and data for which transmission has been suppressed is transmitted separately using different timing.

The information acquisition unit 243 acquires various information from the base station 100 and another terminal device 200. As a specific example, the information acquisition unit 243 may acquire, from the base station 100, information relating to the separate transmission and retransmission of various information and data in a case where transmission of the various information and data to the base station 100 is suppressed.

The determination unit 245 performs various determinations pertaining to control of radio communication with the base station 100 via the radio communication unit 220. For example, the determination unit 245 may determine, by performing channel sensing (LBT, for example), whether or not the channel can be used to transmit various information and data.

The reporting unit 247 reports various information to the base station 100 and another terminal device 200. As a specific example, the reporting unit 247 may report, to the base station 100, information which can be utilized by the base station 100 to control radio communication with the terminal device 200, such as measurement results of the channel congestion level.

2. STUDIES RELATING TO NR-U IMPLEMENTATION

Next, after providing an overview of NR-Unlicensed (NR-U), technological problems for NR-U implementation will be examined. As mentioned earlier, the implementation of NR-based radio communication utilizing unlicensed bands (that is, NR-U) is also under consideration for the Fifth-Generation mobile communication system (5G).

With NR-U, support for various use cases, such as not only Licensed Assisted Access (LAA) using carrier aggregation mechanisms, but also dual connectivity, stand-alone running only on unlicensed bands, and operations combining a licensed band and an unlicensed band is assumed. Examples of operations combining a licensed band and an unlicensed band include, for instance, use cases where a licensed band is utilized for one of a downlink (DL) carrier and an uplink (UL) carrier, while an unlicensed band is utilized for the other carrier (a combination of a licensed DL and an unlicensed UL, for example).

In order to support the foregoing use cases, mechanisms for using unlicensed bands to perform transmission of a physical channel and a physical signal which are transmitted in a primary cell (PCell, PSCell) such as, for example, a synchronization signal (SS), a physical random access channel (PRACH), and a physical uplink control channel (PUCCH), are being examined.

Typically, when utilizing an unlicensed band, a communication device performs carrier sensing (LBT) before transmitting a radio signal (a physical channel and/or physical signal) via a carrier (band, bandwidth, channel) and performs a determination of whether or not the carrier is available (making, for example, either a clear or a busy determination). When a target carrier is available (clear) (that is, when LBT is successful), the communication device is able to transmit a radio signal (a physical channel and/or physical signal) via the carrier. On the other hand, when it is difficult to utilize the target carrier (busy), (that is, when LBT fails), it is difficult for the communication device to transmit a radio signal via the carrier. In other words, in this case, the communication device suppresses transmission of the radio signal via the carrier, for example.

LAA may be cited as an example of a technology utilizing unlicensed bands. With LAA, because a licensed band is utilized for communication in a primary cell, there is no need to perform carrier sensing such as LBT at the time a physical uplink control channel (PUCCH) is transmitted. However, in use cases such as dual connectivity and standalone, unlicensed bands may be utilized for primary-cell uplink communication. Under circumstances in which an unlicensed band is utilized for uplink communication in a primary cell, a situation may be envisioned where information which the base station 100 can utilize for communication control such as a PUCCH is not transmitted from the terminal device 200 to the base station 100 due to LBT failure.

Figure 4:
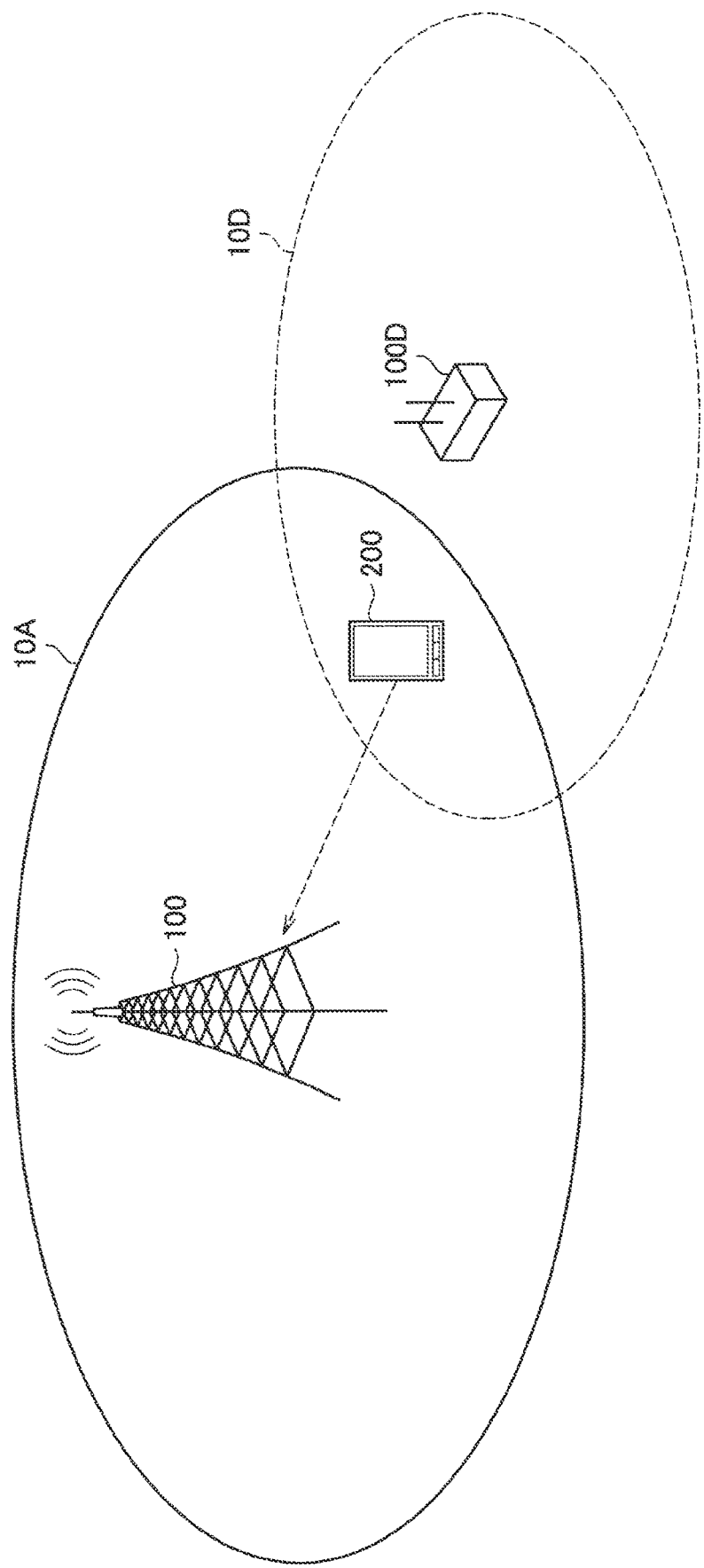
FIG. 4 is an explanatory diagram to illustrate an overview of an example of a case where LBT fails.

For example, FIG. 4 is an explanatory diagram to illustrate an overview of an example of a case where LBT fails and schematically illustrates a situation where the so-called hidden terminal problem may occur. More specifically, in the example illustrated in FIG. 4, the terminal device 200 is positioned in the cell 10A of the base station 100. An access point 100D is also installed in the vicinity of the terminal device 200, and the terminal device 200 is also located within a communication range 10D of the access point 100D. Under such circumstances, when the terminal device 200 executes LBT to transmit a PUCCH to the base station 100, for example, the LBT fails when a carrier scheduled for use is utilized by the access point 100D to transmit the PUCCH. In other words, in this case, the terminal device 200 determines that the carrier is busy and suppresses the scheduled transmission of the PUCCH to the base station 100.

A PUCCH is used to transmit an acknowledgement (HARQ-ACK, HARQ bits, ACK/NACK, or A/N) that corresponds to a physical downlink sharing channel (PDSCH), for example. When the acknowledgement is not sent back from the terminal device 200 using a resource designated by the base station 100, even when a PDSCH has been decoded normally on the terminal device 200 side, the base station 100 retransmits the PDSCH.

Figure 6:
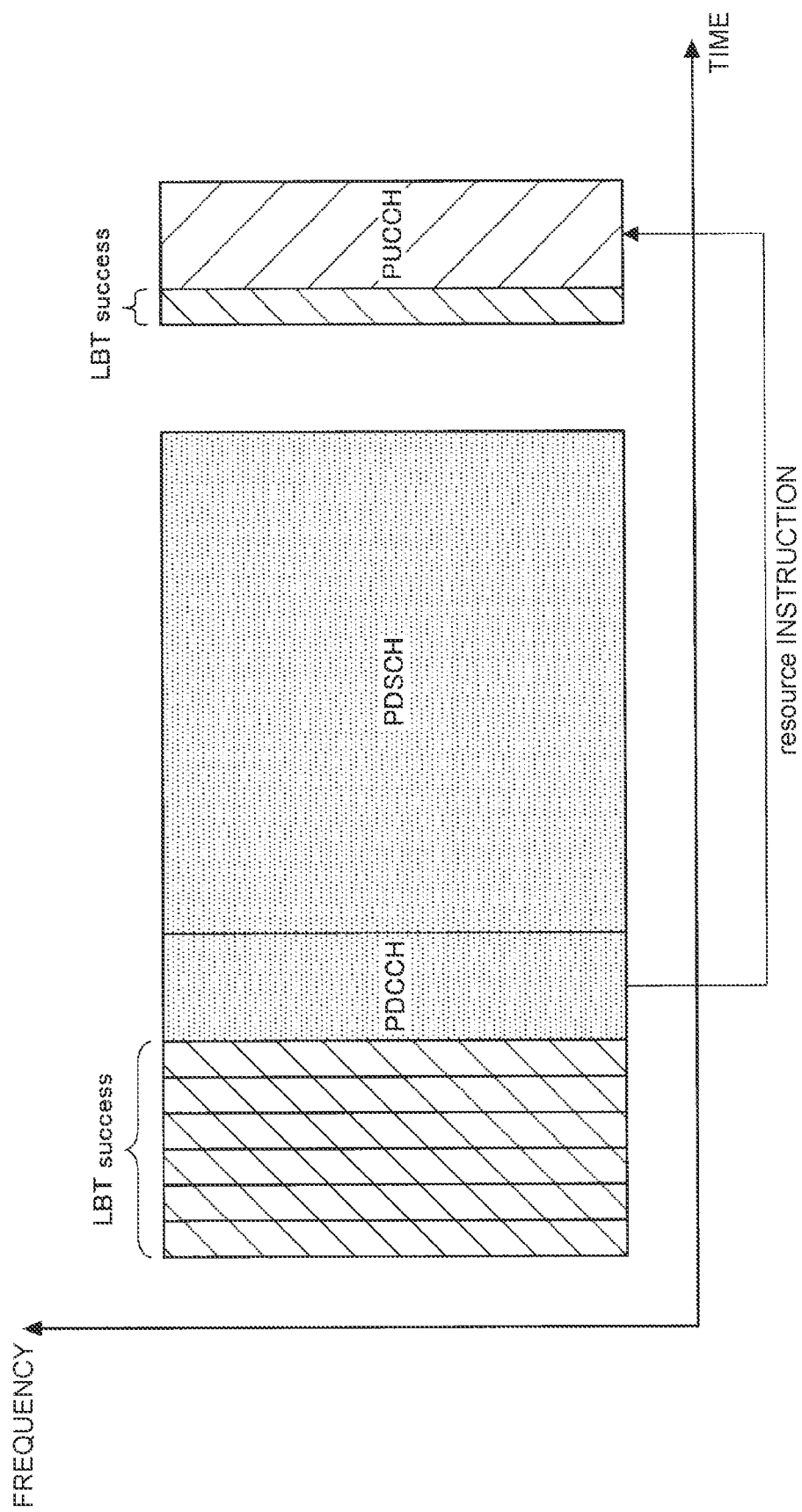
FIG. 6 is an explanatory diagram to illustrate an example of resource scheduling in a system according to the embodiment.
Figure 7:
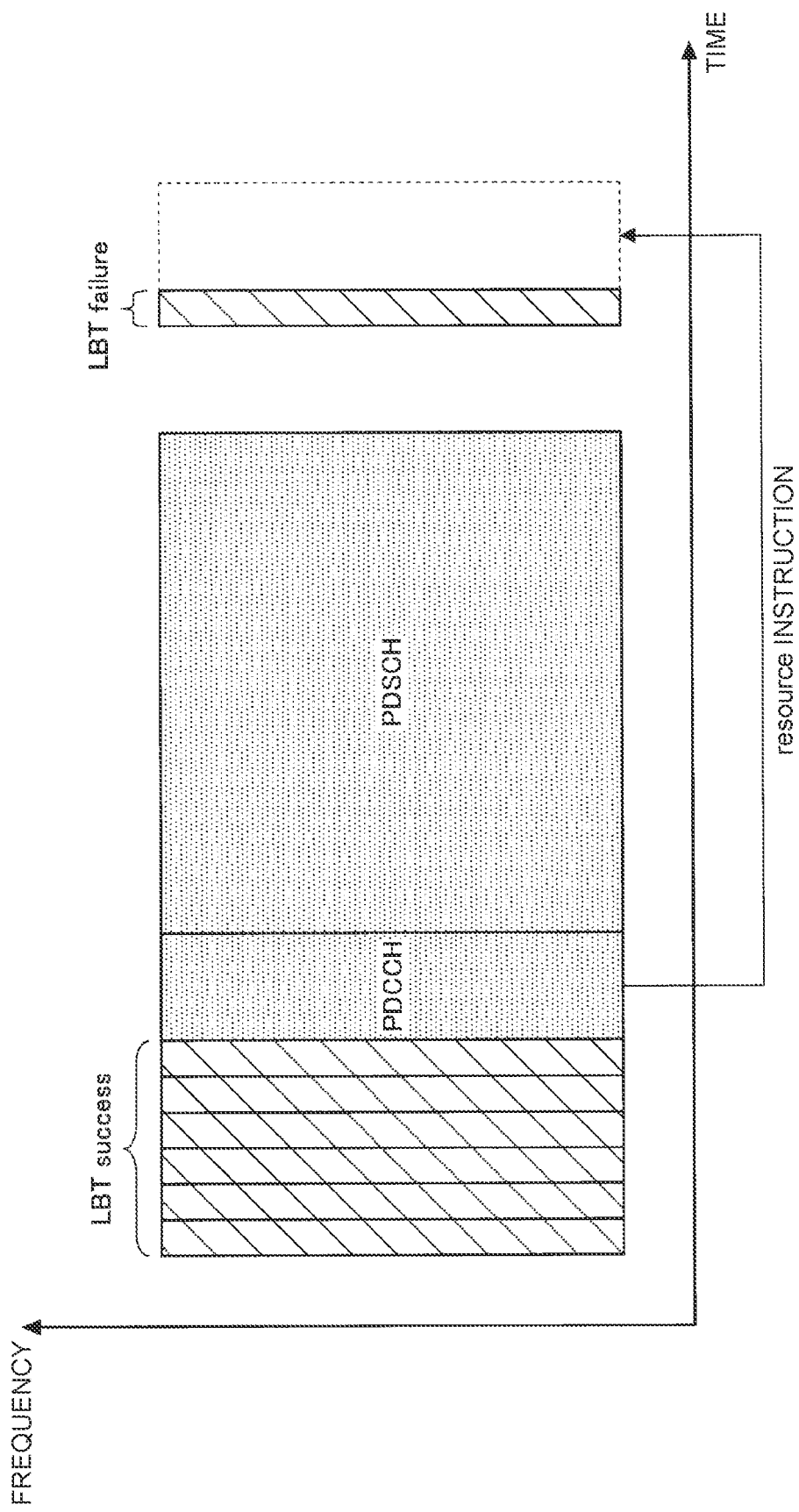
FIG. 7 is an explanatory diagram to illustrate an example of a case where transmission of information utilizing a control channel is difficult.

Here, an overview of an example of processing in a case where an unlicensed band is utilized for communication in a primary cell will be illustrated with reference to FIGS. 5 to 7.

Figure 5:
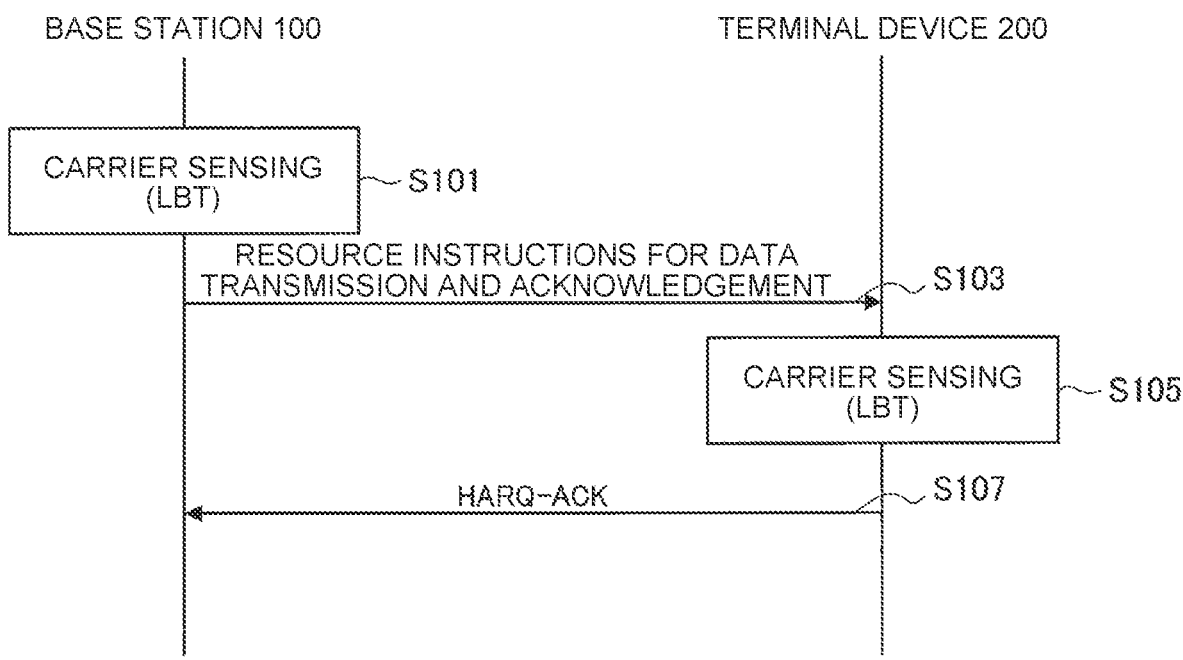
FIG. 5 is an explanatory diagram to illustrate an example of a communication sequence in communication utilizing an unlicensed band.

FIG. 5 is an explanatory diagram to illustrate an example of a communication sequence in communication utilizing an unlicensed band and illustrates an example of a case where an unlicensed band is utilized for communication in a primary cell. More specifically, FIG. 5 illustrates a communication sequence in a case where the base station 100 transmits data to the terminal device 200 and the terminal device 200 sends back an Acknowledgement (ACK) or a Negative-Acknowledgement (NACK) to the base station 100 according to the result of decoding the data. Furthermore, FIG. 6 is an explanatory diagram to illustrate an example of resource scheduling in the system according to this embodiment and illustrates an example of resource scheduling results in a case where a HARQ is realized assuming usage of an unlicensed band. In the example illustrated in FIG. 6, the horizontal axis represents time and the vertical axis represents frequency.

The base station 100 (determination unit 155) determines, when using an unlicensed band to transmit data to the terminal device 200, whether or not the carrier is available for data transmission by performing carrier sensing (LBT) (S101). Further, the base station 100 (communication control unit 151) transmits target data via the carrier to the terminal device 200 upon determining that the carrier is available (S103). A PDSCH is utilized as illustrated in FIG. 6, for example, for the data transmission. Furthermore, at such time, the base station 100 (communication control unit 151) assigns, to the terminal device 200, a resource for sending back an acknowledgement (HARQ-ACK) that corresponds to the data decoding results to the base station 100, and issues an instruction regarding the resource to the terminal device 200. A physical downlink control channel (PDCCH), for example, is utilized for the resource instruction.

The terminal device 200 (communication control unit 241) performs decoding of the data upon receipt of the data from the base station 100 (S105). The terminal device 200 (communication control unit 241) then transmits an acknowledgement corresponding to the data decoding results to the base station 100 which is the transmission source of the data. More specifically, by performing sensing (LBT) of the carrier corresponding to the resource instructed by the base station 100, the terminal device 200 (determination unit 245) determines whether or not the carrier can be utilized to transmit the acknowledgement to the base station 100 (S107). Further, upon determining that the carrier is available, the terminal device 200 (communication control unit 241) transmits an acknowledgement (HARQ-ACK) corresponding to the data decoding results to the base station 100 via the carrier (S109). A PUCCH is utilized, as mentioned earlier, for example, to transmit the acknowledgement.

However, when an unlicensed band is utilized for communication in a primary cell as per NR-U, it is sometimes also difficult, depending on the LBT result, to transmit a physical control channel such as a PDCCH or PUCCH. For example, FIG. 7 is an explanatory diagram to illustrate an example of a case where transmission of information utilizing a physical control channel is difficult. More specifically, in the example illustrated in FIG. 7, similarly to the example illustrated in FIG. 6, a resource for sending back, to the base station 100, an acknowledgement (HARQ-ACK) corresponding to the data decoding results is assigned to the terminal device 200 by the base station 100. However, in the example illustrated in FIG. 7, the LBT result of the terminal device 200 is busy, and it is difficult for the terminal device 200 to use a PUCCH to transmit a HARQ-ACK corresponding to the data decoding results to the base station 100. That is, in the example illustrated in FIG. 7, the terminal device 200 suppresses the sending back of a HARQ-ACK to the base station 100. Furthermore, because a HARQ-ACK is not sent back from the terminal device 200, it is difficult for the base station 100 to determine whether data has been decoded by the terminal device 200, and consequently the base station 100 retransmits the target data. Radio communication resources are consumed unnecessarily due to the occurrence of such data (PDSCH) retransmission, thereby inducing a reduction in the utilization of the overall system resources.

Moreover, "MulteFire" may be cited as an example of technology enabling unlicensed bands to be utilized. MulteFire makes it possible to retransmit HARQ bits corresponding to all HARQ processes, and in comparison with a case where a PDSCH is retransmitted, the advantageous effect of an improved overall system utilization can also be expected. Nevertheless, a situation where information that is substantially unnecessary is also transmitted can be anticipated, and hence it is sometimes difficult to hope for improved resource utilization in HARQ feedback.

In view of the foregoing situation, the present disclosure describes a technology capable of using a more suitable way of implementing radio communication utilizing unlicensed bands, focusing in particular on cases where unlicensed bands are utilized to transmit radio signals (in other words, various information and data) as per NR-U.

3. TECHNICAL FEATURES

Next, the technical features of a system according to an embodiment of the present disclosure will be described hereinbelow. Note that, although HARQ-ACK transmission via a PUCCH is the main focus of the description hereinbelow as an example of a case where an unlicensed band is utilized for communication in a primary cell, the object of the application of the technology of the present disclosure is not necessarily limited. That is, the present disclosure is not limited to or by cases where a HARQ-ACK is transmitted, rather, the technology of the present disclosure can be applied as long as cases involve information being transmitted via a physical uplink control channel (PUCCH).

(Setting of Resource Pertaining to the Transmission of HARQ Bits for which Transmission has been Suppressed)

In the system according to the embodiment of the present disclosure, a resource for separately transmitting HARQ bits which have not been transmitted due to LBT failure or the like (HARQ bits for which transmission has been suppressed, for example) is set (a resource for retransmission, for example). Thus, by improving the utilization of resources by enabling HARQ bits to be transmitted separately, the advantageous effect of further improving the utilization of the overall system resources can be expected. In this case, for example, the base station 100 may take the lead in performing various control.

For example, a trigger (UCI grant) for transmitting a HARQ-ACK may be transmitted from the base station 100 to the terminal device 200. The trigger may be transmitted to the terminal device 200 by utilizing downlink control information (DCI), for example. As a specific example, the base station 100 may report, to the terminal device 200, the fact that a HARQ has not been received. The terminal device 200, which receives this report, may transmit HARQ bits which have not been transmitted previously (in other words, HARQ bits for which transmission was previously suppressed) in addition to the HARQ bits transmitted at the next HARQ feedback opportunity, for example.

Furthermore, as another example, the base station 100 may report, to the terminal device 200, information relating to resources available for HARQ feedback by associating the information with the foregoing trigger. In this case, the terminal device 200 may utilize the foregoing resource reported by the base station 100 to transmit HARQ bits which have not been transmitted previously (in other words, HARQ bits for which transmission was previously suppressed).

Furthermore, in this case, in order to prevent discontinuous transmission (DTX) from being falsely detected as an ACK (DTX-to-ACK false detection), it is advisable to add a code pertaining to error detection (for example, a cyclic redundancy check (CRC)) to the HARQ bits. For reference, in the prior art, for example, processing is switched according to whether or not the number of bits of the data constituting the transmission target is greater than or equal to a predetermined threshold value (eleven bits, for example). As a specific example, when the number of bits of the data constituting the transmission target is greater than or equal to the threshold value, a polar code is used. In contrast, when the number of bits of the data constituting the transmission target is less than the threshold value, a repetition code or a simplex code is used.

Furthermore, this is attributable to the fact that, in a licensed band, the DTX of a PUCCH may be generated when decoding of the PDCCH on which the PUCCH is scheduled has failed. In contrast, in an unlicensed band, it may be necessary to perform LBT when transmitting data. Hence, in addition to the failure of PDCCH decoding, because cases where the non-transmission of PUCCH together with LBT failure can also be expected, the frequency of DTX generation tends to be higher than in a licensed band. Therefore, when an unlicensed band is utilized, improved DTX detection accuracy is to be expected.

In a case where HARQ bits are transmitted using a PUCCH in particular, a CRC is not added when the number of bits is smaller than the threshold value (less than eleven bits in the case of NR, for example). This is due to the fact that, when the number of bits is less than the predetermined information bits (less than eleven bits in the case of NR, for example), the error correction capability of other encoding tends to be higher than the error detection capability using CRC.

In view of the foregoing situation, as an example of an approach for improving the DTX detection capability by adding a CRC to the HARQ bits (that is, the target data), for example, a method may be cited according to which a CRC is added to the data even in a case where the number of HARQ bits is less than the threshold value. That is, even when the HARQ codebook size is less than eleven bits, a CRC may be added to the HARQ bits. Obviously, when the number of HARQ bits is less than the threshold value, there is no need to add the CRC to the data.

Furthermore, as a further example, when the number of HARQ bits (the HARQ codebook size of the HARQ bits, for example) is less than the threshold value, the number of bits of the data may be controlled so as to be greater than or equal to the threshold value.

As a specific example, the terminal device 200 may also insert dummy bits into the data so that the number of HARQ bits is greater than or equal to the threshold value. 0, 1, or NULL (may be either 0 or 1), for example, may be adopted as the dummy bits. Note that the base station 100 may also ignore the dummy bits when the data has been received from the terminal device 200. Note that, as long as the base station 100 is capable of recognizing the dummy bits, there are no particular restrictions on the positions in which the dummy bits are inserted relative to the HARQ bits. As a specific example, dummy bits may be inserted before or after HARQ bits.

In addition, as another example, the terminal device 200 may also perform control so that the number of bits of the data is greater than or equal to the threshold value by rendering the HARQ bits redundant. More specifically, the HARQ bits may be rendered redundant by defining at least some of the HARQ bits in quantities corresponding to a plurality of bits. Thus, an advantageous effect whereby the number of bits is increased and HARQ bit reliability is improved can also be expected.

Furthermore, as another example, by associating further information with HARQ bits, the terminal device 200 may perform control so that the number of bits in a series of data including said data is greater than or equal to the threshold value. For example, by associating information other than HARQ information, such as CSI information (CQI, PMI, RI, CRI, L1-RSRP, etc.) with HARQ bits, the terminal device 200 may perform control so that the number of bits in a series of data is greater than or equal to the threshold value.

Channel congestion level-related information may also be associated as information other than HARQ information. Examples of channel congestion-related information include, for example, information such as a layer 1-received signal strength indicator (L1-RSSI), a channel occupancy ratio, and an LBT success frequency. Note that L1-RSSI indicates an RSSI measured in a short time. Due to this kind of control, for example, hidden terminals that are generally difficult for the base station 100 to discover and which may affect the system can be readily discovered on the base station 100 side. Furthermore, the base station 100 is also capable of selecting a channel for use according to the channel congestion level. Moreover, improved user scheduling accuracy can also be expected.

Additionally, as another example of an approach for improving the DTX detection capability which may be cited is an approach whereby an additional orthogonal sequence is transmitted on a physical channel which includes HARQ bits. Possible examples of the orthogonal sequence include a physical random access channel (PRACH), a demodulation reference signal (DMRS), and the like, for example.

Furthermore, the terminal device 200 may take the lead in executing control for separately transmitting untransmitted HARQ bits. In this case, for example, the terminal device 200 may transmit untransmitted HARQ bits (in other words, HARQ bits for which transmission has been suppressed) in association with an uplink instructed separately. In this case, a PUCCH or PUSCH, for example, may be used as the resource. The resource is desirably preset by the base station 100 by using RRC signaling or the like.

(HARQ Codebook Size Determination)

Next, an example of control pertaining to the determination (HARQ codebook size determination) of the number of transmitted HARQ bits (in other words, the bit size pertaining to PUCCH transmission) in the system according to the embodiment of the present disclosure will be described. Note that, in the description hereinbelow, the number of transmitted HARQ bits is also referred to as the "HARQ codebook size" for the sake of expediency.

For example, the HARQ codebook size may also be determined as the fixed size. In this case, a number of bits corresponding to the HARQ process count, for example, may be secured. Processing similar to the aforementioned MulteFire can also be applied.

As another example, the HARQ codebook size may also be determined semi-statically (semi-static codebook size determination). In this case, the HARQ codebook size is preset. Note that the HARQ codebook size may also be set using RRC signaling, for example.

As another example, the HARQ codebook size may also be determined dynamically (dynamic codebook size determination). More specifically, because a situation may be envisioned where a plurality of HARQ are included, the HARQ codebook size may be dynamically modified according to the situation at the time.

For example, the HARQ codebook size may be dynamically modified according to an instruction from the base station 100. In this case, the number of HARQ bits transmitted from the terminal device 200 to the base station 100 is controlled so as to equal the HARQ codebook size instructed by the base station 100. Note that possible approaches for a HARQ codebook size instruction from the base station 100 include the explicit approach and the implicit approach.

Possible explicit approaches include approaches that utilize a DL Downlink Assignment Index (DAI) or a UL DAI. A DL DAI is a DAI which is contained in DCI for scheduling PDSCH. A DL DAI can be used to map HARQ bits to HARQ processes. A UL DAI is a DAI which is contained in DCI for scheduling PUSCH or PUCCH. A UL DAI is used to decide a maximum number for a HARQ codebook size. Note that information for expanding the size may also be transmitted separately from the DAI.

In an implicit approach, the terminal device 200 modifies the HARQ codebook size upon receipt of a report of other HARQ-related information. As a specific example, when it is reported that a HARQ has not been received from the base station 100, the terminal device 200 may expand the HARQ codebook size. At such time, for example, the terminal device 200 may expand the HARQ codebook size to double the size for all the HARQ processes. Furthermore, as another example, the terminal device 200 may expand the bit size to double the size so as to handle unreceived HARQ processes. Naturally, the foregoing is merely an example, and the bit-size control target and control amount may be suitably set according to the use case.

Furthermore, the terminal device 200 may take the lead in dynamically modifying the HARQ codebook size. In this case, for example, the terminal device 200 is capable of deciding on the modified HARQ codebook size. When the HARQ codebook size is modified, the terminal device 200 associates information relating to the HARQ codebook size with the HARQ bits and transmits same to the base station 100, for example. As a specific example, the terminal device 200 may utilize a dedicated uplink channel to perform reporting of the HARQ codebook size. More specifically, information relating to the HARQ codebook size may be reported to the base station 100 by the terminal device 200 by using bits which are contained in a physical channel. Furthermore, the terminal device 200 may, for example, perform reporting of the HARQ codebook size by associating the HARQ codebook size with a sequence pertaining to communication with the base station 100. As a specific example, the terminal device 200 may perform reporting of the HARQ codebook size by associating the HARQ codebook size with a channel scrambling sequence. In this case, the sequence and the HARQ codebook size information are associated on a one-to-one basis, for example. Additionally, as a further example, the terminal device 200 may also perform reporting of the HARQ codebook size by associating the HARQ codebook size with a DMRS sequence. In this case, the sequence and the HARQ codebook size information are associated on a one-to-one basis, for example.

(Mapping of HARQ Bits to HARQ Processes)

Next, the mapping of HARQ bits to HARQ processes will be described.

In the system according to the embodiment of the present disclosure, a HARQ bitmap is mapped in advance to the HARQ processes on a one-to-one basis, for example. As per LTE and NR cases, DL-DAI may also be utilized for the mapping, for example. Furthermore, as another example, the layout of bitmaps may also be pre-associated with the HARQ processes. The rules of the association in this case may be established using RRC signaling, for example, or the relationship between the sequential order of bits and HARQ processes may be defined in a fixed manner beforehand.

As another example, the terminal device 200 may also transmit both the HARQ bits and information relating to the HARQ processes to the base station 100. In other words, the terminal device 200 may transmit, to the base station 100, bits (1 bit, for example) indicating an ACK/NACK, and a HARQ process index.

(Application to CSI Feedback)

Additionally, as mentioned earlier, the possible applications of the technology according to the embodiment of the present disclosure are not limited only to HARQ. As a specific example, a mechanism like that mentioned earlier can also be applied to a scheduling request (SR), CSI feedback, or the like. A mechanism like that mentioned earlier can be applied to Aperiodic CSI feedback in particular.

(Scheduling Requests)

In the case of NR-U, an SR can be transmitted using a PUCCH. After SR transmission, the terminal device 200 can start an SR prohibit timer. SR transmission is suppressed while the SR prohibit timer is running (in other words, until the SR prohibit timer ends). On the other hand, when SR transmission is suppressed due to LBT failure, the SR prohibit timer does not need to be started. In this case, the terminal device 200 attempts SR transmission of the SR transmission resource (PUCCH resource) of the next cycle.

In addition, when PUSCH scheduling is not performed by the base station 100 despite SR transmission having been performed, the terminal device 200 is capable of considering an SR collision to have occurred.

Having considered an SR collision to have occurred, the terminal device 200 desirably increases the collision window size which is used to determine a random backoff for the LBT that is performed before transmitting the next SR.

Alternatively, having considered an SR collision to have occurred, the terminal device 200 may also apply an SR prohibit timer which is used for the next SR transmission. The value of the SR prohibit timer may be a fixed value, a value which is set by the base station 100, or a value which is determined by the terminal device 200. In the case of a value which is determined by the terminal device 200, the determination may also be made using a variable collision window and a random number, similarly to the random backoff determination. That is, the collision window size is increased according to the SR transmission count. SR transmission collisions can thus be avoided.

When PUSCH scheduling is not performed by the base station 100 although an SR transmission has been made a predetermined number of times, the terminal device 200 initializes a random access procedure.

(Disable HARQ Transmission)

Next, disable HARQ transmission will be described. Disable HARQ transmission is a mechanism for performing control ensuring that a HARQ-ACK is not transmitted in a situation where HARQ feedback is only performed in periods other than COT (the channel occupancy time, i.e., the time for exclusive use by the carrier).

More specifically, in non-COT periods, because a category 4 LBT (an LBT requiring a random backoff using a variable-size collision window), or a category 2 LBT (an LBT not requiring a random backoff) is used, the probability of an LBT failing is high. Hence, through the application of disable HARQ transmission, the advantageous effect of further reducing the probability of LBT failure can be expected by performing control so that HARQ feedback is performed only in COT periods.

Possible triggers for applying disable HARQ transmission include applications based on an instruction to the terminal device 200 from the base station 100 and applications based on a determination by the terminal device 200.

First, an example of control in a case where disable HARQ transmission based on an instruction to the terminal device 200 from the base station 100 is applied will be described. In this case, as methods for reporting the aforementioned instruction to the terminal device 200 from the base station 100, dynamic reporting methods and semi-static reporting methods may be envisioned.

Possible dynamic reporting methods include explicit reporting methods and implicit reporting methods.

Possible explicit reporting methods include a method in which a bit indicating that HARQ bits are not to be transmitted is included in the DL DCI, for example. As a specific example, control may be performed so that when a predetermined switching bit is 1, HARQ bits are transmitted as per HARQ feedback timing information, and when the bit is 0, HARQ feedback timing information is not utilized (is ignored, for example). Note that the relationship between the bit values and the processes may also differ from the foregoing settings.

Further, as another example, a bit that switches the state represented by information relating to the timing of the HARQ feedback (a PDSCH-to-HARQ feedback timing indicator) may also be defined. As a specific example, when a predetermined switching bit is 1, an actual slot index may be utilized to indicate the timing, and when the bit is 0, a virtual slot index may be utilized to indicate the timing. Note that a virtual slot index denotes a slot index for which numbering has been performed only for channel-occupied slots. In addition, the relationship between the bit values and the processes may also differ from the foregoing settings.

As an implicit reporting method, for example, information indicating that HARQ feedback is not to be transmitted may also be included in information relating to the timing of the HARQ feedback (a PDSCH-to-HARQ feedback timing indicator). As a specific example, a state of information relating to HARQ feedback timing may also be defined as a state indicating that HARQ is not to be transmitted. In this case, a state other than the aforementioned state among states of information relating to HARQ feedback timing may also indicate a slot for transmitting a HARQ.

In addition, as a further example, information indicating that HARQ feedback is not to be transmitted may be reported using a combination of information relating to HARQ feedback timing and COT length information. As a specific example, if the HARQ feedback timing is in a COT period, the HARQ may be transmitted, and if the HARQ feedback timing falls outside a COT period, HARQ transmission may be suppressed. Moreover, when HARQ feedback timing falls outside a COT period, HARQ transmission may be performed by utilizing the next COT.

Here, COT length information will be described. COT-related information of the channel as acquired by the base station 100 is reported to the terminal device 200. The base station 100 reports COT-related information in a predetermined period (for example, all or some of the COT) to the terminal device 200. Note that COT-related information may also be overwritten with information that is transmitted using subsequent timing. COT-related information may be information common to a terminal group. In this case, the COT-related information is desirably transmitted using a PDCCH common to the terminal group. Furthermore, the COT-related information may also be reported using a bit string pattern of an orthogonal sequence of a predetermined physical signal (an initial signal, for example).

Further, possible semi-static reporting methods include, for example, a method utilizing RRC signaling. In other words, using RRC signaling, settings may be made so that a HARQ is not transmitted to the terminal device 200 in periods other than a COT period. Note that, either periods that fall within or outside a COT period can be determined through the reporting of COT length, for example.

Next, an example of control in a case where disable HARQ transmission is applied on the basis of determination by the terminal device 200 will be described. More specifically, the terminal device 200 is capable of performing control so that a HARQ is not transmitted (in other words, HARQ transmission is suppressed) under predetermined conditions. Possible conditions when a HARQ is not transmitted include conditions relating to the channel congestion level, for example. As a specific example, the terminal device 200 may suppress HARQ transmission when the RSSI or the channel occupancy ratio exceeds a predetermined threshold value. Accordingly, because the transmission frequency can be lowered in a situation where a channel is congested, for example, the probability of collisions occurring between transmissions from the terminal devices can be reduced.

Note that a HARQ for which transmission has not been performed (in other words, a HARQ for which transmission has been suppressed) can be transmitted separately (retransmitted) by applying the same method as for a HARQ which has not been transmitted due to LBT failure.

(Supplementary Information)

Examples of an uplink physical channel which is available for HARQ feedback include msg.A in 2-step RACH in addition to PUCCH and PUSCH. msg.A is a message which is transmitted to the base station 100 from the terminal device 200 in the initial step of 2-step RACH. In this case, the HARQ bits are desirably transmitted in association with a msg.A PUSCH.

4. APPLICATION EXAMPLES

The technology according to the present disclosure can be applied to various products. For example, the base station 100 may be realized as any type of evolved Node B (eNB) such as a macro eNB or a small eNB. The small eNB may be an eNB that covers a cell smaller than a macrocell, such as a pico eNB, a micro eNB, or a home (femto) eNB. Instead, the base station 100 may be realized as another type of base station such as a NodeB or a base transceiver station (BTS). The base station 100 may include a main entity (also referred to as a base station device) that controls radio communication, and one or more remote radio heads (RRHs) disposed at different locations from the main entity. Further, various types of terminals, described subsequently, may operate as the base station 100 by performing base station functions temporarily or semi-permanently. In addition, at least some of the constituent elements of the base station 100 may be realized in a base station device or a module for the base station device.

Further, for example, the terminal device 2 may be realized as a mobile terminal such as a smartphone, a tablet personal computer (PC), a notebook PC, a portable game terminal, a portable/dongle mobile router, or a digital camera, or an in-vehicle terminal such as a car navigation device. Furthermore, the terminal device 2 may be realized as a terminal that performs machine to machine (M2M) communication (also referred to as a machine type communication (MTC) terminal). In addition, at least some of the constituent elements of the terminal device 2 may be implemented in a module (for example, an integrated circuit module configured from one die) that is built into these terminals.

<4.1. Base Station-Related Application Examples>

First Application Example

Figure 8:
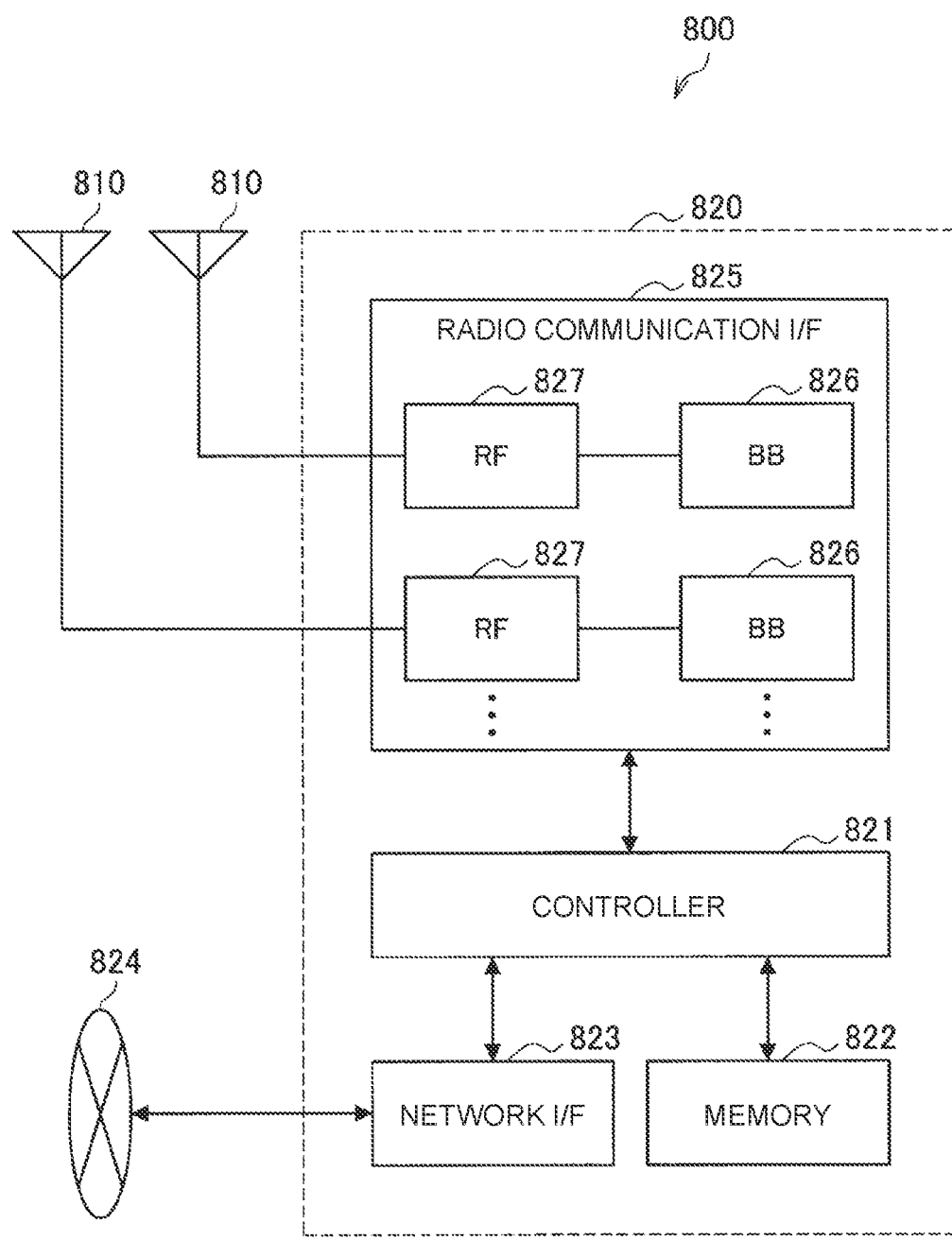
FIG. 8 is a block diagram illustrating a first example of a schematic configuration of an eNB.

FIG. 8 is a block diagram illustrating a first example of a schematic configuration of an eNB to which the technology according to the present disclosure may be applied. An eNB 800 includes one or more antennas 810 and a base station device 820. Each of the antennas 810 and the base station device 820 may be interconnected via an RF cable.

Each of the antennas 810 includes one or a plurality of antenna elements (for example, a plurality of antenna elements constituting a MIMO antenna) and is used by the base station device 820 to transmit and receive radio signals. The eNB 800 includes a plurality of antennas 810 as illustrated in FIG. 8, and the plurality of antennas 810 may correspond to a plurality of frequency bands used by the eNB 800, respectively, for example. Note that, although FIG. 8 illustrates an example in which the eNB 800 includes a plurality of antennas 810, the eNB 800 may also include a single antenna 810.

The base station device 820 includes a controller 821, a memory 822, a network interface 823, and a radio communication interface 825.

The controller 821 may be, for example, a CPU or a DSP, and operates various functions of a host layer of the base station device 820. For example, the controller 821 generates a data packet from data in a signal processed by the radio communication interface 825, and transfers the generated packet via the network interface 823. The controller 821 may generate a bundled packet by bundling data from a plurality of baseband processors and transfer the generated bundled packet. Further, the controller 821 may also have a logical function of performing control such as radio resource control, radio bearer control, mobility management, admission control, or scheduling. The control may also be performed in cooperation with a peripheral eNB or a core network node. The memory 822 includes a RAM and a ROM, and stores a program executed by the controller 821 and a variety of control data (such as, for example, a terminal list, transmit power data, and scheduling data).

The network interface 823 is a communication interface for connecting the base station device 820 to a core network 824. The controller 821 may communicate with a core network node or another eNB via the network interface 823. In this case, the eNB 800 and a core network node or another eNB may be interconnected through a logical interface (for example, an S1 interface or X2 interface). The network interface 823 may be a wired communication interface or a radio communication interface for radio backhaul. In the case where the network interface 823 is a radio communication interface, the network interface 823 may use a frequency band for radio communication which is higher than the frequency band used by the radio communication interface 825.

The radio communication interface 825 supports a cellular communication system such as long term evolution (LTE) or LTE-Advanced, and provides a radio connection to a terminal located within the cell of the eNB 800 via the antenna 810. The radio communication interface 825 may typically include a baseband (BB) processor 826, an RF circuit 827, and the like. The BB processor 826 may, for example, perform encoding/decoding, modulation/demodulation, multiplexing/demultiplexing, and the like, and performs a variety of signal processing on each layer (for example, L1, medium access control (MAC), radio link control (RLC), and packet data convergence protocol (PDCP)). The BB processor 826 may have some or all of the foregoing logical functions instead of the controller 821. The BB processor 826 may be a module that includes a memory for storing a communication control program, a processor to execute the program, and a related circuit, and the function of the BB processor 826 may be changeable by updating the program. Further, the module may be a card or blade which is inserted into a slot of the base station device 820, or a chip mounted on the card or the blade. Meanwhile, the RF circuit 827 may include a mixer, a filter, an amplifier, and the like, and transmits and receives radio signals via the antenna 810.

The radio communication interface 825 includes a plurality of BB processors 826 as illustrated in FIG. 8, and the plurality of BB processors 826 may correspond to a plurality of frequency bands used by the eNB 800, respectively, for example. Furthermore, the radio communication interface 825 may include a plurality of RF circuits 827 as illustrated in FIG. 8, and the plurality of RF circuits 827 may correspond to a plurality of antenna elements, respectively, for example. Note that, although FIG. 8 illustrates an example in which the radio communication interface 825 includes a plurality of BB processors 826 and a plurality of RF circuits 827, the radio communication interface 825 may include a single BB processor 826 or a single RF circuit 827.

In the eNB 800 illustrated in FIG. 8, one or more constituent elements (for example, at least one of the communication control unit 151, the information acquisition unit 153, the determination unit 155, and the reporting unit 157) included in the base station 100 described with reference to FIG. 2 may also be mounted in the radio communication interface 825. Alternatively, at least some of the constituent elements may be mounted in the controller 821. As one example, the eNB 800 may incorporate a module that includes part (for example, the BB processor 826) or all of the radio communication interface 825 and/or the controller 821. One or more of the foregoing constituent elements may also be mounted in the module. In this case, the module may store a program for causing a processor to function as the one or more constituent elements (in other words, a program for causing the processor to execute operations of the one or more constituent elements) and may execute the program.

As another example, a program for causing the processor to function as the one or more constituent elements may be installed in the eNB 800, and the radio communication interface 825 (for example, the BB processor 826) and/or the controller 821 may execute the program. In this way, the eNB 800, the base station device 820, or the module may be provided as a device including the one or more constituent elements, and a program for causing the processor to function as the one or more constituent elements may be provided. In addition, a readable recording medium on which the program is recorded may be provided.

Furthermore, in the eNB 800 illustrated in FIG. 8, the radio communication unit 120 described with reference to FIG. 2 may also be mounted in the radio communication interface 825 (for example, the RF circuit 827). Further, the antenna unit 110 may be mounted in the antenna 810. In addition, the network communication unit 130 may be mounted in the controller 821 and/or the network interface 823. Further, the storage unit 140 may be mounted in the memory 822.

Second Application Example

Figure 9:
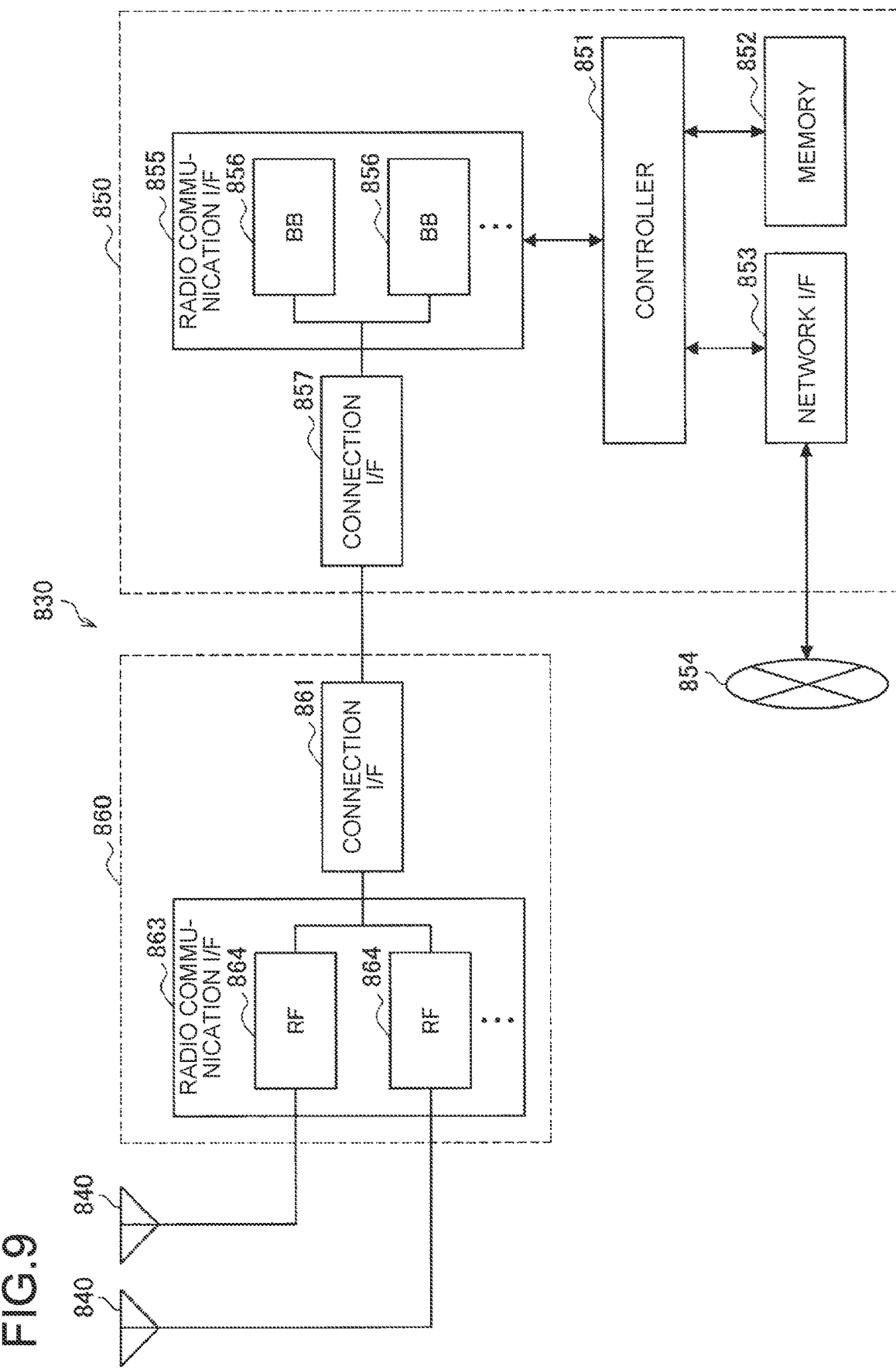
FIG. 9 is a block diagram illustrating a second example of a schematic configuration of an eNB.

FIG. 9 is a block diagram illustrating a second example of a schematic configuration of an eNB to which the technology according to the present disclosure may be applied. An eNB 830 includes one or more antennas 840, a base station device 850, and an RRH 860. Each of the antennas 840 and the RRH 860 may be interconnected via an RF cable. Further, the base station device 850 and the RRH 860 may be interconnected by a high speed line such as optical fiber cables.

The antennas 840 each include one or a plurality of antenna elements (for example, a plurality of antenna elements constituting a MIMO antenna) and are used to transmit and receive radio signals using the RRH 860. The eNB 830 includes a plurality of antennas 840 as illustrated in FIG. 9, and the plurality of antennas 840 may correspond to a plurality of frequency bands used by the eNB 830, respectively, for example. Note that, although FIG. 9 illustrates an example in which the eNB 830 includes a plurality of antennas 840, the eNB 830 may also include a single antenna 840.

The base station device 850 includes a controller 851, a memory 852, a network interface 853, a radio communication interface 855, and a connection interface 857. The controller 851, memory 852, and network interface 853 are the same as the controller 821, memory 822, and network interface 823 described with reference to FIG. 8.

The radio communication interface 855 supports any cellular communication system such as LTE or LTE-Advanced and provides a radio connection, via the RRH 860 and the antenna 840, to a terminal located in a sector corresponding to the RRH 860. The radio communication interface 855 may typically include a BB processor 856 or the like. The BB processor 856 is the same as the BB processor 826 described with reference to FIG. 8 except for being connected to the RF circuit 864 of the RRH 860 via the connection interface 857. The radio communication interface 855 includes a plurality of BB processors 856 as illustrated in FIG. 8, and the plurality of BB processors 856 may correspond to a plurality of frequency bands used by the eNB 830, respectively, for example. Note that, although FIG. 9 illustrates an example in which the radio communication interface 855 includes a plurality of BB processors 856, the radio communication interface 855 may include a single BB processor 856.

The connection interface 857 is an interface for connecting the base station device 850 (radio communication interface 855) to the RRH 860. The connection interface 857 may be a communication module for communication on the high speed line which connects the base station device 850 (radio communication interface 855) to the RRH 860.

Further, the RRH 860 includes a connection interface 861 and a radio communication interface 863.

The connection interface 861 is an interface for connecting the RRH 860 (radio communication interface 863) to the base station device 850. The connection interface 861 may be a communication module for communication on the high speed line.

The radio communication interface 863 transmits and receives radio signals via the antenna 840. The radio communication interface 863 may typically include the RF circuit 864 or the like. The RF circuit 864 may include a mixer, a filter, an amplifier, and the like, and transmits and receives radio signals via the antenna 840. The radio communication interface 863 may include a plurality of RF circuits 864 as illustrated in FIG. 9, and the plurality of RF circuits 864 may correspond to a plurality of antenna elements, respectively, for example. Note that, although FIG. 9 illustrates an example in which the radio communication interface 863 includes a plurality of RF circuits 864, the radio communication interface 863 may include a single RF circuit 864, for example.

In the eNB 830 illustrated in FIG. 9, one or more constituent elements (for example, at least one of the communication control unit 151, the information acquisition unit 153, the determination unit 155, and the reporting unit 157) included in the base station 100 described with reference to FIG. 2 may also be mounted in the radio communication interface 855 and/or the radio communication interface 863. Alternatively, at least some of the constituent elements may be mounted in the controller 851. As one example, the eNB 830 may incorporate a module that includes part (for example, the BB processor 856) or all of the radio communication interface 855 and/or the controller 851. One or more of the foregoing constituent elements may also be mounted in the module. In this case, the module may store a program for causing a processor to function as the one or more constituent elements (in other words, a program for causing the processor to execute operations of the one or more constituent elements) and may execute the program. As another example, a program for causing the processor to function as the one or more constituent elements may be installed in the eNB 830, and the radio communication interface 855 (for example, the BB processor 856) and/or the controller 851 may execute the program. In this way, the eNB 830, the base station device 850, or the module may be provided as a device including the one or more constituent elements, and a program for causing the processor to function as the one or more constituent elements may be provided. In addition, a readable recording medium on which the program is recorded may be provided.

Furthermore, in the eNB 830 illustrated in FIG. 9, the radio communication unit 120 described with reference to FIG. 2, for example, may also be mounted in the radio communication interface 863 (for example, the RF circuit 864). Further, the antenna unit 110 may be mounted in the antenna 840. In addition, the network communication unit 130 may be mounted in the controller 851 and/or the network interface 853. Further, the storage unit 140 may be mounted in the memory 852.

<4.2. Terminal Device-Related Application Examples>

First Application Example

Figure 10:
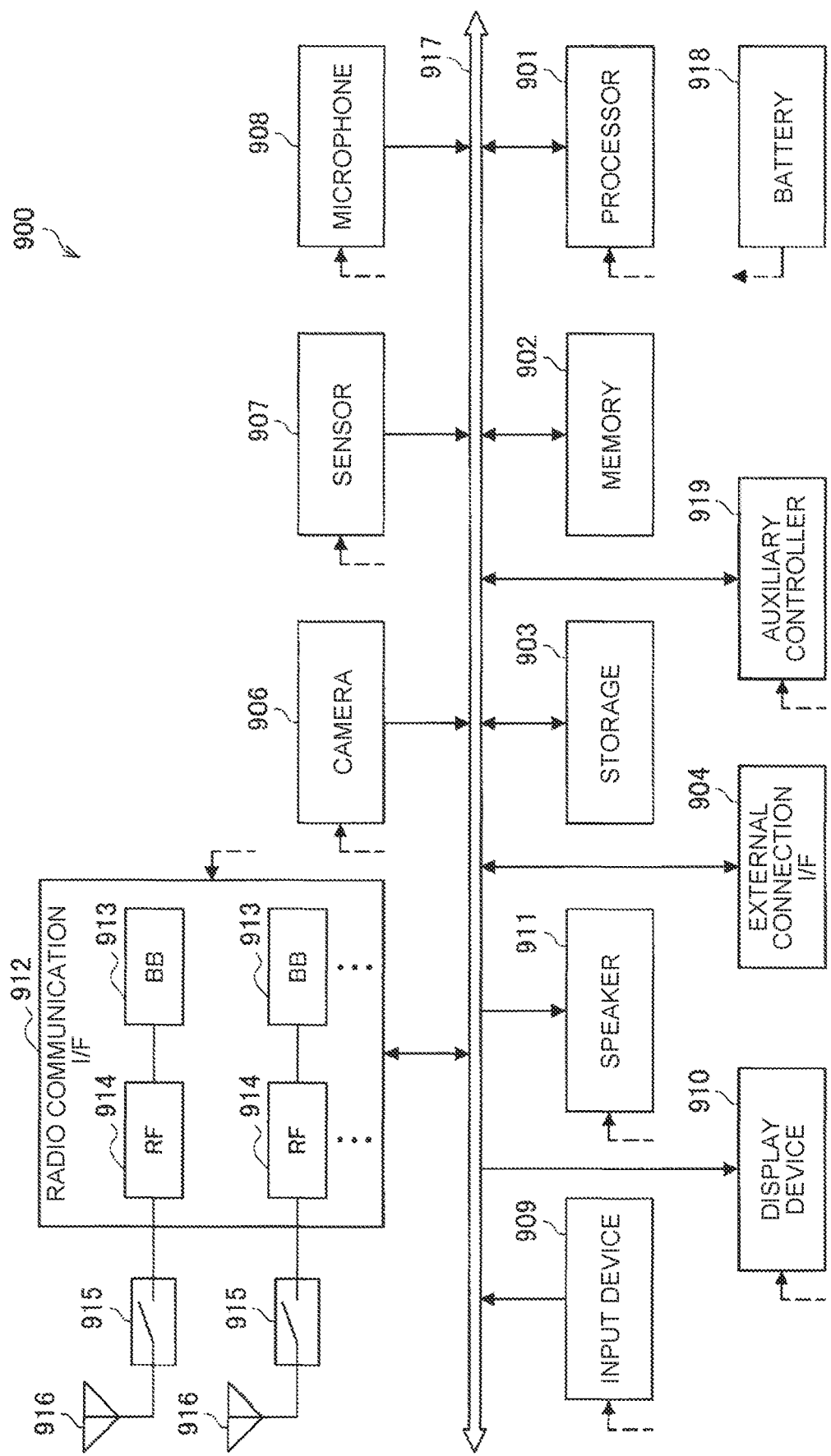
FIG. 10 is a block diagram illustrating an example of a schematic configuration of a smartphone.

FIG. 10 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a loudspeaker 911, a radio communication interface 912, one or more antenna switches 915, one or more antennas 916, a bus 917, a battery 918, and an auxiliary controller 919.

The processor 901 may be, for example, a CPU or a system on chip (SoC) and controls the functions of an application layer and other layers of the smartphone 900. The memory 902 includes a RAM and a ROM, and stores a program executed by the processor 901 and data. The storage 903 may include a storage medium such as a semiconductor memory or a hard disk. The external connection interface 904 is an interface for connecting externally attached devices such as memory cards or universal serial bus (USB) devices to the smartphone 900.

The camera 906 includes, for example, an imaging element such as a charge coupled device (CCD) or a complementary metal oxide semiconductor (CMOS), and generates a captured image. The sensor 907 may include a sensor group including, for example, a positioning sensor, a gyro sensor, a geomagnetic sensor, an acceleration sensor, and the like. The microphone 908 converts a sound that is inputted to the smartphone 900 to an audio signal. The input device 909 includes, for example, a touch sensor which detects touching of a screen of the display device 910, a keypad, a keyboard, a button, a switch, or the like, and accepts an operation or an information input from a user. The display device 910 includes a screen such as a liquid crystal display (LCD) or an organic light emitting diode (OLED) display and displays an output image of the smartphone 900. The loudspeaker 911 converts the audio signal that is outputted from the smartphone 900 to audio.

The radio communication interface 912 supports any cellular communication system such as LTE or LTE-Advanced and performs radio communication. The radio communication interface 912 may typically include a BB processor 913, an RF circuit 914, and the like. The BB processor 913 may, for example, perform encoding/decoding, modulation/demodulation, multiplexing/demultiplexing, and the like, and executes a variety of types of signal processing for radio communication. On the other hand, the RF circuit 914 may include a mixer, a filter, an amplifier, and the like, and transmits and receives radio signals via the antenna 916. The radio communication interface 912 may be a one-chip module in which the BB processor 913 and the RF circuit 914 are integrated. The radio communication interface 912 may include a plurality of BB processors 913 and a plurality of RF circuits 914, as illustrated in FIG. 10. Note that, although FIG. 10 illustrates an example in which the radio communication interface 912 includes a plurality of BB processors 913 and a plurality of RF circuits 914, the radio communication interface 912 may include a single BB processor 913 or a single RF circuit 914.

Further, the radio communication interface 912 may support other types of radio communication system such as a short range radio communication system, a near field communication system, or a wireless local area network (LAN) system in addition to the cellular communication system, and in this case, the radio communication interface 912 may include the BB processor 913 and the RF circuit 914 for each radio communication system.

Each antenna switch 915 switches a connection destination of the antenna 916 among a plurality of circuits (for example, circuits for different radio communication systems) included in the radio communication interface 912.

The antennas 916 each include one or a plurality of antenna elements (for example, a plurality of antenna elements constituting a MIMO antenna) and are used for transmission and reception of radio signals by the radio communication interface 912. The smartphone 900 may include a plurality of antennas 916 as illustrated in FIG. 10. Note that, although FIG. 10 illustrates an example in which the smartphone 900 includes a plurality of antennas 916, the smartphone 900 may also include a single antenna 916.

Further, the smartphone 900 may be provided with the antenna 916 for each radio communication system. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the loudspeaker 911, the radio communication interface 912, and the auxiliary controller 919. The battery 918 supplies power to each block of the smartphone 900 illustrated in FIG. 10 via a supply line which is partially illustrated in the drawing using broken lines. The auxiliary controller 919 operates minimally necessary functions of the smartphone 900 in a sleep mode, for example.

In the smartphone 900 illustrated in FIG. 10, one or more constituent elements (for example, at least one of the communication control unit 241, the information acquisition unit 243, the determination unit 245, and the reporting unit 247) included in the terminal device 200 described with reference to FIG. 3 may also be mounted in the radio communication interface 912. Alternatively, at least some of these constituent elements may be mounted in the processor 901 or the auxiliary controller 919. As one example, the smartphone 900 may incorporate a module that includes part (for example, the BB processor 913) or all of the radio communication interface 912, the processor 901 and/or the auxiliary controller 919. One or more of the foregoing constituent elements may also be mounted in the module. In this case, the module may store a program for causing a processor to function as the one or more constituent elements (in other words, a program for causing the processor to execute operations of the one or more constituent elements) and may execute the program. As another example, a program for causing the processor to function as the one or more constituent elements may be installed in the smartphone 900, and the radio communication interface 912 (for example, the BB processor 913), the processor 901, and/or the auxiliary controller 919 may execute the program. In this way, the smartphone 900 or the module may be provided as a device including the one or more constituent elements, and a program for causing the processor to function as the one or more constituent elements may be provided. In addition, a readable recording medium on which the program is recorded may be provided.

Furthermore, in the smartphone 900 illustrated in FIG. 10, the radio communication unit 220 described with reference to FIG. 3, for example, may also be mounted in the radio communication interface 912 (for example, the RF circuit 914). Further, the antenna unit 210 may be mounted in the antenna 916. Further, the storage unit 230 may be mounted in the memory 902.

Second Application Example

Figure 11:
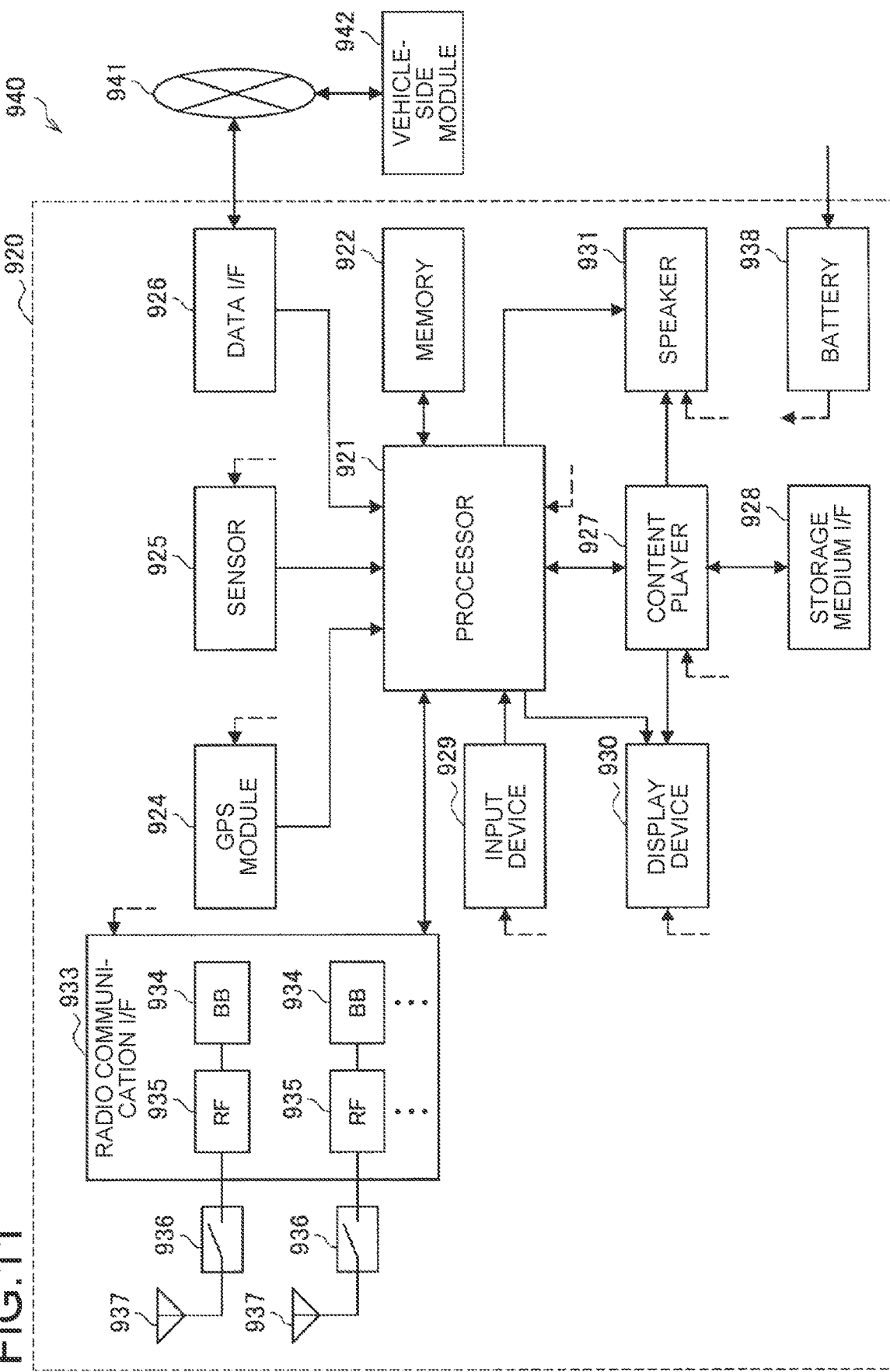
FIG. 11 is a block diagram illustrating an example of a schematic configuration of a car navigation device.

FIG. 11 is a block diagram illustrating an example of a schematic configuration of a car navigation device 920 to which the technology according to the present disclosure may be applied. The car navigation device 920 includes a processor 921, a memory 922, a global positioning system (GPS) module 924, a sensor 925, a data interface 926, a content player 927, a storage medium interface 928, an input device 929, a display device 930, a loudspeaker 931, a radio communication interface 933, one or more antenna switches 936, one or more antennas 937, and a battery 938.

The processor 921 may be a CPU or an SoC, for example, and controls the navigation function and the other functions of the car navigation device 920. The memory 922 includes a RAM and a ROM, and stores a program executed by the processor 921 and data.

The GPS module 924 uses a GPS signal received from a GPS satellite to measure the position (for example, latitude, longitude, and altitude) of the car navigation device 920. The sensor 925 may include a sensor group including, for example, a gyro sensor, a geomagnetic sensor, a barometric sensor, and the like. The data interface 926 is, for example, connected to an in-vehicle network 941 via a terminal that is not illustrated, and acquires data generated on the vehicle side such as vehicle speed data.

The content player 927 plays back content stored in a storage medium (for example, a CD or DVD) inserted into the storage medium interface 928. The input device 929 includes, for example, a touch sensor which detects touching of a screen of the display device 930, a button, a switch, or the like, and accepts operations from a user or information inputs. The display device 930 includes a screen such as an LCD or OLED display and displays images of navigation functions or played back content. The loudspeaker 931 outputs audio of the navigation functions or played back content.

The radio communication interface 933 supports any cellular communication system such as LTE or LTE-Advanced and performs radio communication. The radio communication interface 933 may typically include a BB processor 934, a RF circuit 935, and the like. The BB processor 934 may, for example, perform encoding/decoding, modulation/demodulation, multiplexing/demultiplexing, and the like, and executes a variety of types of signal processing for radio communication. On the other hand, the RF circuit 935 may include a mixer, a filter, an amplifier, and the like, and transmits and receives radio signals via the antenna 937. The radio communication interface 933 may be a one-chip module in which the BB processor 934 and the RF circuit 935 are integrated. The radio communication interface 933 may include a plurality of BB processors 934 and a plurality of RF circuits 935, as illustrated in FIG. 11. Note that, although FIG. 11 illustrates an example in which the radio communication interface 933 includes a plurality of BB processors 934 and a plurality of RF circuits 935, the radio communication interface 933 may include a single BB processor 934 or a single RF circuit 935.

Further, the radio communication interface 933 may support other types of radio communication system such as a short range radio communication system, a near field communication system, or a wireless LAN system in addition to the cellular communication system, and in this case, the radio communication interface 933 may include the BB processor 934 and the RF circuit 935 for each radio communication system.

Each antenna switch 936 switches a connection destination of the antenna 937 between a plurality of circuits (for example, circuits for different radio communication systems) included in the radio communication interface 933.

The antennas 937 each include one or a plurality of antenna elements (for example, a plurality of antenna elements constituting a MIMO antenna) and is used for transmission and reception of radio signals by the radio communication interface 933. The car navigation device 920 may include a plurality of antennas 937 as illustrated in FIG. 11. Note that, although FIG. 11 illustrates an example in which the car navigation device 920 includes a plurality of antennas 937, the car navigation device 920 may also include a single antenna 937.

Further, the car navigation device 920 may include the antenna 937 for each radio communication system. In this case, the antenna switch 936 may be omitted from a configuration of the car navigation device 920.

The battery 938 supplies power to each block of the car navigation device 920 illustrated in FIG. 11 via a supply line which is partially illustrated in the drawing using broken lines. Further, the battery 938 stores the electric power supplied from the vehicle side.

In the car navigation device 920 illustrated in FIG. 11, one or more constituent elements (for example, at least one of the communication control unit 241, the information acquisition unit 243, the determination unit 245, and the reporting unit 247) included in the terminal device 200 described with reference to FIG. 3, described with reference to FIG. 3 may also be mounted in the radio communication interface 933. Alternatively, at least some of the constituent elements may be mounted in the processor 921. As one example, the car navigation device 920 may incorporate a module that includes part (for example, the BB processor 934) or all of the radio communication interface 933 and/or the processor 921. One or more of the foregoing constituent elements may also be mounted in the module. In this case, the module may store a program for causing a processor to function as the one or more constituent elements (in other words, a program for causing the processor to execute operations of the one or more constituent elements) and may execute the program. As another example, a program for causing the processor to function as the one or more constituent elements may be installed in the car navigation device 920, and the radio communication interface 933 (for example, the BB processor 934) and/or the processor 921 may execute the program. In this way, the car navigation device 920 or the module may be provided as a device including the one or more constituent elements, and a program for causing the processor to function as the one or more constituent elements may be provided. In addition, a readable recording medium on which the program is recorded may be provided.

Furthermore, in the car navigation device 920 illustrated in FIG. 11, the radio communication unit 220 described with reference to FIG. 3, for example, may also be mounted in the radio communication interface 933 (for example, the RF circuit 935). Further, the antenna unit 210 may be mounted in the antenna 937. Furthermore, the storage unit 230 may be mounted in the memory 922.

The technology of the present disclosure may also be realized as an in-vehicle system (or a vehicle) 940 including one or more blocks of the aforementioned car navigation device 920, the in-vehicle network 941, and a vehicle-side module 942. The vehicle-side module 942 generates vehicle data such as vehicle speed, engine speed, and breakdown information, and outputs the generated data to the in-vehicle network 941.

5. CONCLUSION

As described hereinabove, in the system according to the embodiment of the present disclosure, the terminal device includes: a communication unit that performs radio communication; and a control unit that performs carrier sensing together with a base station and that performs control so that a radio signal is transmitted via a carrier which is designated by the base station according to the results of the sensing. The foregoing control unit performs control so that information relating to the transmission of uplink control information in a case where transmission of the uplink control information via the carrier is suppressed is acquired from the base station.

According to the foregoing configuration, even in a case where transmission of the control information (for example, uplink control information) has been suppressed in a situation where unlicensed bands are utilized for communication in a primary cell as per NR-U, a situation where retransmission of information and data is performed unnecessarily can be prevented from occurring. Thus, because a situation where radio communication resources are consumed unnecessarily can be prevented from occurring, the utilization of the overall system resources can be further improved. Thus, according to the technology of the embodiment of the present disclosure, radio communication utilizing unlicensed bands can be realized in a more preferable manner.

Although preferred embodiments of the present disclosure have been described in detail hereinabove with reference to the accompanying drawings, the technical scope of the present disclosure is not limited to or by such examples. It will be apparent to a person having ordinary knowledge in the technical field of the present disclosure that various modification examples or revision examples are conceivable within the scope of the technological ideas set forth in the claims and that such modification examples or revision examples are naturally understood to fall within the technical scope of the present disclosure.

Furthermore, the advantageous effects described in the present specification are merely illustrative or exemplary and are not restrictive. That is, the technology according to the present disclosure can afford other advantageous effects that would be apparent to a person skilled in the art from the description of the present specification in addition to or instead of the foregoing advantageous effects.

Note that the following configurations also belong to the technical scope of the present disclosure.

(1)

A communication device, comprising:
    a communication unit that performs radio communication; and
    a control unit that performs carrier sensing together with a base station and that performs control so that a radio signal is transmitted via a carrier which is designated by the base station according to the results of the sensing,
    wherein the control unit performs control so that information relating to transmission of uplink control information in a case where transmission of the uplink control information via the carrier is suppressed is acquired from the base station.

(2)

The communication device according to (1), wherein the control unit suppresses transmission of the uplink control information on the basis of the results of the sensing.

(3)

The communication device according to (1), wherein the control unit suppresses transmission of the uplink control information on the basis of an instruction from the base station.

(4)

The communication device according to (3), wherein the control unit suppresses transmission of the uplink control information according to control of transmission timing of the uplink control information by the base station.

(5)

The communication device according to (1), wherein the control unit suppresses transmission of the uplink control information according to a channel congestion level.

(6)

The communication device according to any one of (1) to (5), wherein the control unit acquires, as information relating to transmission of the uplink control information, information relating to the uplink control information constituting a target for transmission to the base station.

(7)

The communication device according to (6), wherein the control unit performs control so that the uplink control information is transmitted to the base station after associating a code pertaining to error detection with the uplink control information.

(8)

The communication device according to (7), wherein, after performing control so that the number of bits of the uplink control information is greater than or equal to a threshold value, the control unit associates the code pertaining to error detection with the post-control uplink control information.

(9)

The communication device according to (8), wherein the control unit performs control so that the number of bits of the uplink control information is greater than or equal to a threshold value by associating other control information with the uplink control information.

(10)

The communication device according to (9), wherein the other control information includes information relating to a channel congestion level.

(11)

The communication device according to any one of (1) to (5), wherein the control unit:

acquires, as information relating to transmission of the uplink control information, information relating to an uplink resource which is available for transmission of the uplink control information, and performs control so that, when transmission of the uplink control information is suppressed, the uplink control information is transmitted by utilizing the uplink resource.

(12)

The communication device according to any one of (1) to (11), wherein the control unit controls, according to a predetermined condition, a bit size pertaining to the transmission of the uplink control information for which transmission is suppressed.

(13)

The communication device according to (12), wherein the control unit controls the bit size according to an instruction from the base station.

(14)

The communication device according to (12), wherein the control unit expands the bit size pertaining to transmission of the uplink control information in response to a report relating to the uplink control information not having been received from the base station.

(15)

The communication device according to (12), wherein, when the bit size has been controlled, the control unit performs control so that information relating to the post-control bit size is reported to the base station.

(16)

The communication device according to (15), wherein the control unit performs control so that the information relating to the bit size is reported to the base station by associating the information with a sequence pertaining to communication with the base station.

(17)

The communication device according to (16), wherein the control unit associates the information relating to the bit size with a channel scrambling sequence.

(18)

A communication device, comprising:

a communication unit that performs radio communication; and a control unit that performs control so that a radio signal is transmitted via a carrier which is designated for a terminal device according to results of carrier sensing together with the terminal device, wherein the control unit performs control so that information relating to transmission of uplink control information, in a case where transmission of the uplink control information via the carrier by the terminal device is suppressed, is transmitted to the terminal device.

(19)

A communication method performed by a computer, the method comprising:

performing radio communication; and performing carrier sensing together with a base station and performing control so that a radio signal is transmitted via a carrier which is designated by the base station according to the results of the sensing, wherein control is performed so that information relating to transmission of uplink control information in a case where transmission of the uplink control information via the carrier is suppressed is acquired from the base station.

(20)

A communication method performed by a computer, the method comprising:

performing radio communication; and performing control so that a radio signal is transmitted via a carrier which is designated for a terminal device according to results of carrier sensing together with the terminal device, wherein control is performed so that information relating to transmission of uplink control information, in a case where transmission of the uplink control information via the carrier by the terminal device is suppressed, is transmitted to the terminal device.

(21)
A program that causes a computer to execute:
performing radio communication; and
performing carrier sensing together with a base station and performing control so that a radio signal is transmitted via a carrier which is designated by the base station according to the results of the sensing,
wherein control is performed so that information relating to transmission of uplink control information in a case where transmission of the uplink control information via the carrier is suppressed is acquired from the base station.

(22)
A program that causes a computer to execute:
performing radio communication; and
performing control so that a radio signal is transmitted via a carrier which is designated for a terminal device according to results of carrier sensing together with the terminal device,
wherein control is performed so that information relating to transmission of uplink control information, in a case where transmission of the uplink control information via the carrier by the terminal device is suppressed, is transmitted to the terminal device.

REFERENCE SIGNS LIST

1 SYSTEM
100 BASE STATION
110 ANTENNA UNIT
120 RADIO COMMUNICATION UNIT
130 NETWORK COMMUNICATION UNIT
140 STORAGE UNIT
150 CONTROL UNIT
151 COMMUNICATION CONTROL UNIT
153 INFORMATION ACQUISITION UNIT
155 DETERMINATION UNIT
157 REPORTING UNIT
200 TERMINAL DEVICE
210 ANTENNA UNIT
220 RADIO COMMUNICATION UNIT
230 STORAGE UNIT
240 CONTROL UNIT
241 COMMUNICATION CONTROL UNIT
243 INFORMATION ACQUISITION UNIT
245 DETERMINATION UNIT
247 REPORTING UNIT

The invention claimed is:

1. A communication device, comprising:
a communication unit configured to perform radio communication; and
a control unit configured to:
perform carrier sensing together with a base station;
perform control so that a radio signal is transmitted via a carrier which is designated by the base station according to results of the carrier sensing; and
perform control so that information relating to transmission of uplink control information, in a case where the transmission of the uplink control information via the carrier is suppressed, is acquired from the base station.

2. The communication device according to claim 1, wherein the control unit is further configured to suppress the transmission of the uplink control information based on the results of the carrier sensing.

3. The communication device according to claim 1, wherein the control unit is further configured to suppress the transmission of the uplink control information based on an instruction from the base station.

4. The communication device according to claim 3, wherein the control unit is further configured to suppress the transmission of the uplink control information based on control of transmission timing of the uplink control information by the base station.

5. The communication device according to claim 1, wherein the control unit is further configured to suppress the transmission of the uplink control information based on a channel congestion level.

6. The communication device according to claim 1, wherein the control unit is further configured to acquire, as the information relating to the transmission of the uplink control information, information relating to the uplink control information constituting a target for transmission to the base station.

7. The communication device according to claim 6, wherein the control unit is further configured to perform control so that the uplink control information is transmitted to the base station after associating a code pertaining to error detection with the uplink control information.

8. The communication device according to claim 7, wherein, after performing control so that a number of bits of the uplink control information is greater than or equal to a threshold value, the control unit is further configured to associate the code pertaining to the error detection with post-control uplink control information.

9. The communication device according to claim 8, wherein the control unit is further configured to perform control so that the number of bits of the uplink control information is greater than or equal to the threshold value by associating other control information with the uplink control information.

10. The communication device according to claim 9, wherein the other control information includes information relating to a channel congestion level.

11. The communication device according to claim 1, wherein the control unit is further configured to:
acquire, as the information relating to the transmission of the uplink control information, information relating to an uplink resource which is available for the transmission of the uplink control information; and
perform control so that, when the transmission of the uplink control information is suppressed, the uplink control information is transmitted by utilizing the uplink resource.

12. The communication device according to claim 1, wherein the control unit is further configured to control, according to a specific condition, a bit size pertaining to the transmission of the uplink control information for which the transmission is suppressed.

13. The communication device according to claim 12, wherein the control unit is further configured to control the bit size according to an instruction from the base station.

14. The communication device according to claim 12, wherein the control unit is further configured to expand the bit size pertaining to the transmission of the uplink control information in response to a report relating to the uplink control information not having been received from the base station.

15. The communication device according to claim 12, wherein, when the bit size has been controlled, the control unit is further configured to perform control so that information relating to post-control bit size is reported to the base station.

16. The communication device according to claim 15, wherein the control unit is further configured to perform control so that the information relating to the bit size is reported to the base station by associating the information with a sequence pertaining to communication with the base station.

17. The communication device according to claim 16, wherein the control unit is further configured to associate the information relating to the bit size with a channel scrambling sequence.

18. A communication device, comprising:

a communication unit configured to perform radio communication; and a control unit configured to:

perform control so that a radio signal is transmitted via a carrier which is designated for a terminal device according to results of carrier sensing together with the terminal device; and perform control so that information relating to transmission of uplink control information, in a case where the transmission of the uplink control information via the carrier by the terminal device is suppressed, is transmitted to the terminal device.

19. A communication method performed by a computer, the communication method comprising:

performing radio communication;

performing carrier sensing together with a base station; performing control so that a radio signal is transmitted via a carrier which is designated by the base station according to results of the carrier sensing; and performing control so that information relating to transmission of uplink control information, in a case where the transmission of the uplink control information via the carrier is suppressed, is acquired from the base station.

20. A communication method performed by a computer, the communication method comprising:

performing radio communication;

performing control so that a radio signal is transmitted via a carrier which is designated for a terminal device according to results of carrier sensing together with the terminal device; and performing control so that information relating to transmission of uplink control information, in a case where the transmission of the uplink control information via the carrier by the terminal device is suppressed, is transmitted to the terminal device.

21. A non-transitory computer-readable medium having stored thereon, computer-executable instructions which, when executed by a processor, cause the processor to execute operations, the operations comprising:

performing radio communication;

performing carrier sensing together with a base station and performing control so that a radio signal is transmitted via a carrier which is designated by the base station according to results of the carrier sensing; and performing control so that information relating to transmission of uplink control information, in a case where the transmission of the uplink control information via the carrier is suppressed, is acquired from the base station.

22. A non-transitory computer-readable medium having stored theron, computer-executable instructions which, when executed by a processor, cause the processor to execute operations, the operations comprising:

performing radio communication;

performing control so that a radio signal is transmitted via a carrier which is designated for a terminal device according to results of carrier sensing together with the terminal device; and performing control so that information relating to transmission of uplink control information, in a case where the transmission of the uplink control information via the carrier by the terminal device is suppressed, is transmitted to the terminal device.

* * * * *